(12) United States Patent
Blackburn et al.

(10) Patent No.: US 7,410,691 B2
(45) Date of Patent: Aug. 12, 2008

(54) PHOTOCHROMIC OPTICAL ARTICLE

(75) Inventors: William P. Blackburn, Safety Harbor, FL (US); Michael B. Levesque, Tampa, FL (US); Kevin J. Stewart, Murrysville, PA (US); Cathy L. Short, Largo, FL (US)

(73) Assignee: PPG Industries Ohio, Inc., Cleveland, OH (US)

( * ) Notice: Subject to any disclaimer, the term of this patent is extended or adjusted under 35 U.S.C. 154(b) by 700 days.

(21) Appl. No.: 10/793,241

(22) Filed: Mar. 4, 2004

(65) Prior Publication Data

US 2004/0207809 A1 Oct. 21, 2004

Related U.S. Application Data

(63) Continuation-in-part of application No. 10/229,773, filed on Aug. 28, 2002.

(60) Provisional application No. 60/344,167, filed on Dec. 27, 2001.

(51) Int. Cl.
*B32B 17/10* (2006.01)
*G02C 7/02* (2006.01)

(52) U.S. Cl. .................. 428/334; 428/339; 428/412; 428/423.1; 351/159

(58) Field of Classification Search .............. 428/412, 428/423.1, 332, 334, 336, 339, 424.2, 425.3, 428/447; 351/159, 163, 166
See application file for complete search history.

(56) References Cited

U.S. PATENT DOCUMENTS

| | | | |
|---|---|---|---|
| 3,361,706 A | 1/1968 | Meriwether et al. | 260/39 |
| 3,971,872 A | 7/1976 | LeBoeuf | 428/412 |
| 4,166,043 A | 8/1979 | Uhlmann et al. | 252/300 |
| 4,367,170 A | 1/1983 | Uhlmann et al. | 252/286 |
| 4,405,679 A | 9/1983 | Fujioka et al. | 428/216 |
| 4,526,996 A | 7/1985 | Kilgour et al. | 556/413 |
| 4,720,356 A | 1/1988 | Chu | 252/586 |
| 4,731,264 A | 3/1988 | Lin et al. | 427/387 |
| 4,756,973 A | 7/1988 | Sakagami et al. | 428/412 |
| 4,873,029 A | 10/1989 | Blum | 264/1.3 |
| 4,904,525 A | 2/1990 | Taniguchi et al. | 428/328 |
| 4,931,220 A | 6/1990 | Haynes et al. | 252/586 |
| 5,051,309 A | 9/1991 | Kawaki et al. | 428/332 |
| 5,104,692 A | 4/1992 | Belmares | 427/164 |
| 5,130,353 A | 7/1992 | Fischer et al. | 524/43 |
| 5,134,191 A | 7/1992 | Takarada et al. | 524/783 |
| 5,185,390 A | 2/1993 | Fischer et al. | 524/43 |
| 5,231,156 A | 7/1993 | Lin | 526/279 |
| 5,391,327 A | 2/1995 | Ligas et al. | 252/586 |
| 5,462,866 A | 10/1995 | Wang | 435/174 |
| 5,580,819 A | 12/1996 | Li et al. | 427/167 |
| 5,621,017 A | 4/1997 | Kobayakawa et al. | 522/16 |
| 5,639,802 A | 6/1997 | Neckers et al. | 522/25 |
| 5,645,767 A | 7/1997 | Van Gemert | 252/586 |
| 5,658,501 A | 8/1997 | Kumar et al. | 252/586 |
| 5,674,941 A | 10/1997 | Cho et al. | |
| 5,728,769 A | 3/1998 | Natesh et al. | 524/591 |
| 5,757,459 A | 5/1998 | Bhalakia et al. | 351/168 |
| 5,770,115 A | 6/1998 | Misura | 252/586 |
| 5,776,376 A | 7/1998 | Nagoh et al. | 252/586 |
| 5,827,614 A | 10/1998 | Bhalakia et al. | 428/411.1 |
| 5,856,860 A | 1/1999 | Bhalakia et al. | 351/168 |
| 5,910,375 A | 6/1999 | Parker et al. | 428/520 |
| 5,916,669 A | 6/1999 | Parker et al. | 428/216 |
| 5,962,617 A | 10/1999 | Slagel | 528/61 |
| 6,025,026 A | 2/2000 | Smith et al. | 427/316 |
| 6,060,001 A | 5/2000 | Welch et al. | 252/586 |
| 6,065,836 A | 5/2000 | Krishnan et al. | 351/163 |
| 6,107,395 A | 8/2000 | Rosthauser et al. | 524/719 |
| 6,150,430 A * | 11/2000 | Walters et al. | 522/79 |
| 6,175,450 B1 | 1/2001 | Andreani et al. | 359/586 |
| 6,187,444 B1 | 2/2001 | Bowles et al. | 428/423.1 |
| 6,190,777 B1 | 2/2001 | Asano et al. | 428/447 |
| 6,268,055 B1 | 7/2001 | Walters et al. | 428/413 |
| 6,328,446 B1 | 12/2001 | Bhalakia et al. | 351/163 |

(Continued)

FOREIGN PATENT DOCUMENTS

EP 1433814 A1 6/2004

(Continued)

OTHER PUBLICATIONS

Encyclopedia Of Chemical Technology, Kirk-Othmer, Third Edition, vol. 22, pp. 360-377, no date available.

*Primary Examiner*—Thao Tran
(74) *Attorney, Agent, or Firm*—Frank P. Mallak; Deborah M. Altman

(57) ABSTRACT

Describes a photochromic article, e.g., a plastic ophthalmic photochromic article, such as a lens, in which the article includes (1) a rigid substrate, such as a thermoset or thermoplastic polymeric substrate, (2) a photochromic polymeric coating appended to at least one surface of the substrate, the photochromic polymeric coating containing a photochromic amount of at least one photochromic material, e.g., spirooxazine, naphthopyran and/or fulgide, and (3) an acrylate-based film coherently appended to the photochromic coating, the acrylate-based film containing an adhesion promoting amount of an adhesion promoter, e.g., an aminoorganosilane, silane coupling agent, organic titanate coupling agent or organic zirconate coupling agent. Describes also the aforedescribed photochromic article having an abrasion-resistant coating affixed to the acrylate-based film, e.g., an abrasion-resistant coating comprising an organo silane; and a photochromic article having an antireflective coating affixed to the abrasion-resistant coating.

16 Claims, No Drawings

U.S. PATENT DOCUMENTS

| | | | |
|---|---|---|---|
| 6,367,930 B1 | 4/2002 | Santelices et al. | 351/177 |
| 6,432,544 B1 | 8/2002 | Stewart et al. | 428/424.2 |
| 6,448,425 B1 | 9/2002 | Gedon et al. | 556/413 |
| 6,455,163 B1 | 9/2002 | Okamoto et al. | 428/412 |
| 6,506,488 B1 | 1/2003 | Stewart et al. | 428/332 |
| 6,531,076 B2 | 3/2003 | Crano et al. | 252/586 |
| 6,547,390 B1 * | 4/2003 | Bernheim et al. | 351/163 |
| 6,602,603 B2 * | 8/2003 | Welch et al. | 428/412 |
| 2002/0006505 A1 | 1/2002 | Nishizawa et al. | |
| 2002/0114054 A1 | 8/2002 | Rietjens et al. | |
| 2003/0008149 A1 | 1/2003 | Moravec et al. | |

FOREIGN PATENT DOCUMENTS

| | | |
|---|---|---|
| JP | 64-30744 | 2/1989 |
| JP | 3-35236 | 2/1991 |
| JP | 3-269507 | 12/1991 |
| WO | WO 94/20581 | 9/1994 |
| WO | WO 96/37573 | 11/1996 |
| WO | WO 97/06944 | 2/1997 |
| WO | WO 97/22894 | 6/1997 |
| WO | WO 00/33111 | 6/2000 |
| WO | WO 00/34410 | 6/2000 |
| WO | WO 00/36048 | 6/2000 |
| WO | WO 01/02449 | 1/2001 |
| WO | WO 01/55269 | 8/2001 |
| WO | WO 02/093235 A | 11/2002 |
| WO | WO 03/058300 A | 7/2003 |

* cited by examiner ved

PHOTOCHROMIC OPTICAL ARTICLE

CROSS-REFERENCE TO RELATED APPLICATIONS

This application is a continuation-in-part application of application Ser. No. 10/229,773 filed Aug. 28, 2002, which application is based on provisional patent application 60/344,167 filed on Dec. 27, 2001.

DESCRIPTION OF THE INVENTION

The present invention relates to photochromic articles comprising a rigid substrate to which is applied a photochromic polymeric coating, particularly an organic substrate, e.g., plastic substrates used for optical applications. In particular, the present invention relates to photochromic articles used for ophthalmic applications, e.g., lenses. More particularly, the present invention relates to photochromic articles comprising a transparent polymeric substrate having a transparent photochromic organic polymeric coating appended to at least a portion of at least one surface of the substrate, and a transparent, radiation-cured, acrylate-based thin film containing an adhesion enhancing amount of at least one adhesion promoting material, such as an organo-silane, superposed on, e.g., appended to, said photochromic coating.

International patent publication WO 03/058300 A1 describes a photochromic article comprising a transparent polymeric substrate, a transparent photochromic organic polymeric coating appended to a surface of the substrate and a transparent, radiation-cured acrylate-based film appended to the photochromic coating, which acrylate-based film is resistant to aqueous inorganic caustic, adheres firmly to the photochromic polymeric coating, is compatible with abrasion-resistant, organo silane-containing coatings that may be applied to its exposed surface, and is itself scratch resistant relative to the photochromic coating.

It is common for different manufacturers of the aforedescribed photochromic articles to use different abrasion-resistant coatings, some of which are proprietary, depending on the requirements and specifications for their respective photochromic articles. Further, different manufacturers may have different manufacturing process for applying the abrasion-resistant coating, which manufacturing processes may also be proprietary. It has been observed recently that the compatibility of the acrylate-based film described in WO 03/058300 A1 with the abrasion-resistant coating can vary with the type of abrasion-resistant coating used by such manufacturers.

More particularly, some abrasion-resistant coatings used in the industry have been observed recently to be less adherent to an acrylate-based film coating than others. It has now been discovered that enhancement of the compatibility of the acrylate-based film with the abrasion-resistant coating applied to the acrylate-based film can be achieved by including adhesion-enhancing amounts of at least one adhesion promoting material within the acrylate-based film. In a particular embodiment, adhesion promoting organo-silane, e.g., aminosilane, compounds have been found to be particularly useful in enhancing the compatibility of the acrylate-based film with the abrasion-resistant coating, such as an organo silane-containing abrasion-resistant coating.

Still more particularly, the present invention relates to photochromic articles, such as an ophthalmic plastic lens, on at least one surface of which has been appended sequentially, a first layer of a transparent, preferably optically clear, photochromic polymeric coating and a second layer of the above-described adhesion promoting material-containing transparent, radiation-cured, acrylate-based film. In a further embodiment of the present invention, there is contemplated photochromic articles having a third layer comprising at least one abrasion-resistant coating that is applied to the second layer. In a still further embodiment, a fourth layer, e.g., an antireflective coating, is applied to the abrasion-resistant coating third layer. Additional layers can be applied to or below the fourth layer to provide additional functional properties, e.g., a protective layer.

Clear ophthalmic articles that provide good imaging qualities while reducing the transmission of incident light into the eye are needed for a variety of applications, such as sunglasses, vision correcting ophthalmic lenses, plano lenses and fashion lenses, e.g., non-prescription and prescription lenses, sport masks, face shields, goggles, visors, camera lenses, windows, automotive windshields and aircraft and automotive transparencies, e.g., T-roofs, sidelights and backlights. Responsive to that need, photochromic plastic articles used for optical applications have been given considerable attention. In particular, photochromic ophthalmic plastic lenses have been of interest because of the weight advantage they offer, vis-à-vis, glass lenses.

In addition, embodiments of the present invention can be used in association with plastic films and sheets, optical devices, e.g., optical switches, display devices and memory storage devices, such as those described in U.S. Pat. No. 6,589,452, and security elements, such as optically-readable data media, e.g., those described in U.S. Patent Application 2002/0142248, security elements in the form of threads or strips, as described in U.S. Pat. No. 6,474,6956, and security elements in the form of verification marks that can be placed on security documents and articles of manufacture.

Photochromism is a phenomenon involving a reversible change in color of an organic or inorganic material, e.g., a chromene or silver halide salt, or an article comprising such a material, upon exposure to ultraviolet radiation. Sources of radiation that contain ultraviolet rays include, for example, sunlight and the light of a mercury lamp. When the photochromic material is exposed to ultraviolet radiation, it exhibits a change in color, and when the ultraviolet radiation is discontinued, the photochromic material returns to its original color or colorless state. Ophthalmic articles that have photochromic material(s) applied to or incorporated within the article exhibit this reversible change in color and a consequent reversible change in light transmission.

The mechanism believed to be responsible for the reversible change in color, i.e., the change in the absorption spectrum in the electromagnetic spectrum of visible light (400-700 nm), that is characteristic of different types of organic photochromic compounds has been described. See, for example, John C. Crano, "Chromogenic Materials (Photochromic)", Kirk-Othmer Encyclopedia of Chemical Technology, fourth Edition, 1993, pp. 321-332. The mechanism responsible for the reversible change in color for organic photochromic compounds, such as indolino spiropyrans and indolino spirooxazines, is reported to involve an electrocyclic mechanism. When exposed to activating ultraviolet radiation, these organic photochromic compounds transform from a colorless closed ring form into a colored open ring form. In contrast, the electrocyclic mechanism responsible for the reversible change in color of photochromic fulgide compounds is reported to involve a transformation from a colorless open ring form into a colored closed ring form.

Photochromic plastic articles have been prepared by incorporating the photochromic material into the plastic substrate by surface imbibition techniques. See, for example, U.S. Pat.

Nos. 5,130,353 and 5,185,390, which describe the inclusion of photochromic dyes into the subsurface region of a plastic article, such as a lens, by first applying one or more photochromic dyes/compounds to the surface of the plastic article, either as the neat photochromic dye/compound or dissolved in a polymeric or other organic solvent carrier, and then applying heat to the coated surface to cause the photochromic dye/compound(s) to diffuse into the subsurface region of the lens (a process commonly referred to as "imbibition"). The plastic substrates of such photochromic plastic articles are reported to have sufficient free volume within the polymer matrix to allow photochromic compounds, such as the aforementioned spirooxazines, spiropyrans and fulgides, to transform from the colorless form into the colored form, and then revert to their original colorless form. There are, however, certain polymer matrices that are not considered to have sufficient free volume to allow the aforedescribed electrocyclic mechanism to occur sufficiently to permit their use as a substrate for imbibed (or internally incorporated) photochromic materials for commercially acceptable photochromic applications. Such substrates include, for example, thermoset polymer matrices, such as those prepared from polyol (allyl carbonate) monomers such as allyl diglycol carbonate monomers, e.g., diethylene glycol bis(allyl carbonate), and copolymers thereof, the commonly known thermoplastic bisphenol A-based polycarbonates, and highly cross-linked optical polymers.

To allow the use of thermoset polymers, thermoplastic polycarbonates, and highly cross-linked optical polymeric materials as plastic substrates for photochromic articles, it has been proposed to apply organic photochromic coatings to the surface of such plastic substrates. See, for example, U.S. Pat. No. 6,187,444 B1, which describes the application of a photochromic polyurethane coating to a plastic substrate. It has also been proposed to apply an abrasion-resistant coating onto the exposed surface of the photochromic coating to protect the surface of the photochromic coating from scratches and other similar cosmetic defects resulting from physical handling, cleaning and exposure of the photochromic coating to the environment. See, for example, U.S. Pat. No. 6,268,055 B1. International Patent Application WO 03/058300 A1 describes also applying a radiation-cured acrylate-based thin film between the photochromic coating and the abrasion resistant coating to attenuate certain manufacturing problems associated with removing defective abrasion resistant coatings and/or antireflective coatings from the photochromic coating, and to protect a photochromic coating having no abrasion-resistant coating during handling and shipment.

In accordance with a particular embodiment of the present invention, there is contemplated a photochromic article, e.g., a lens, comprising, in combination:
  (a) a rigid substrate;
  (b) an organic polymeric coating appended to at least a portion of at least one surface of said polymeric substrate, said polymeric coating comprising a photochromic amount of at least one photochromic material; and
  (c) radiation-cured, adhesion promoter-containing acrylate-based film appended coherently to said photochromic polymeric coating, the exposed surface of said radiation-cured acrylate film being:
    (1) resistant to removal as a result of treatment with aqueous inorganic caustic,
    (2) compatible with organo silane-containing abrasion resistant coating, and
    (3) scratch resistant relative to the photochromic coating.

In another embodiment of the present invention, there is contemplated the above-described transparent photochromic article further comprising an abrasion-resistant coating, such as a hard coating comprising an organo silane, appended to the exposed surface of the radiation-cured acrylate-based film. In a further embodiment of the present invention, there is contemplated a photochromic article that has an antireflective coating applied to the abrasion-resistant coating. Other coatings, such as antistatic and/or antiwetting coatings can also be applied to or below the antireflective coating.

In a still further embodiment of the present invention, there is contemplated a photochromic article comprising, in combination:
  (a) a transparent organic polymer substrate, such as a thermoset substrate prepared from a polymerizable composition comprising an allyl diglycol carbonate, such as diethylene glycol bis(allyl carbonate), a substrate prepared from thermoplastic polycarbonate, a substrate prepared from a polyurea urethane, or a substrate prepared from compositions comprising the reaction product of polyfunctional isocyanate(s) and/or isothiocyanate(s) with polythiol or polyepisulfide monomer(s);
  (b) a transparent organic polymeric photochromic coating, such as an acrylic-based, polyurethane-based, polyurea urethane-based, aminoplast resin-based or polyepoxy-based photochromic coating, appended to at least one surface of said plastic substrate, said polymeric photochromic coating comprising a photochromic amount of at least one organic photochromic material;
  (c) transparent, radiation-cured adhesion promoter-containing acrylate-based film adhered coherently to said photochromic coating; and
  (d) optionally an abrasion resistant coating, such as an organo silane-containing hard coating, adhered to said acrylate-based film, the surface of said radiation-cured acrylate-based film being (1) resistant to removal as a result of treatment with dilute aqueous inorganic caustic solutions, such as alkali metal hydroxide solutions, (2) compatible with organo silane-containing abrasion-resistant coating, and (3) more scratch resistant than the photochromic polymeric coating, i.e., harder than the photochromic polymeric coating. In yet a further contemplated embodiment, an antireflective coating is adhered to said abrasion-resistant coating, assuming that the abrasion-resistant coating is present.

DETAILED DESCRIPTION OF THE INVENTION

In accordance with the present invention, there are provided photochromic articles comprising, in combination, a rigid substrate, e.g., a transparent substrate such as glass or an organic polymeric material; a photochromic polymeric coating affixed to at least a portion of at least one surface of the substrate; and a radiation-cured, adhesion promoter-containing acrylate-based film superposed on, e.g., adhered to, the photochromic coating, the acrylate-based film being (a) scratch resistant, (b) resistant to treatment with dilute aqueous inorganic caustic solutions, and (c) compatible with abrasion-resistant, organo silane-containing coatings. In a further embodiment of the present invention, an abrasion resistant coating, e.g., an organo silane hard coating, is applied to the radiation-cured acrylate-based film. In a still further contemplated embodiment, additional coatings are applied to the abrasion resistant coating. Such additional coatings can include, but are not limited to, antireflective coatings, antistatic coatings, water repellant coatings and combinations of such coatings.

For purposes of this specification (other than in the operating examples), unless otherwise indicated, all numbers expressing quantities and ranges of ingredients, reaction conditions, etc., such as those expressing refractive indices and wavelengths, are to be understood as modified in all instances by the term "about". Accordingly, unless indicated to the contrary, the numerical parameters set forth in this specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

As used herein, the term "cure", "cured" or similar terms, as used in connection with a cured or curable composition, e.g., a "cured composition" of some specific description, is intended to mean that at least a portion of the polymerizable and/or crosslinkable components that form the curable composition is at least partially polymerized and/or crosslinked. In certain embodiments, the crosslink density of the crosslinkable components, e.g., the degree of crosslinking, can range from 5% to 100% of complete crosslinking. In other embodiments, the crosslink density can range from 35% to 85%, e.g., 50% to 85%, of full crosslinking. The degree of crosslinking can range between any combination of the previously stated values, inclusive of the recited values.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The phrase "radiation-cured, acrylate-based film" refers to a polymerizable composition containing at least one acrylic or methacrylic-containing component in which the polymerizable components have been at least partially cured, crosslinked and/or reacted.

The specific citation in this specification of patent applications, published or granted patents and published articles, such as the disclosures in identified patents that are referred to by column and line number, which describe relevant methods for preparing monomers, polymerizates, coatings, articles of manufacture, photochromic compounds, etc. are incorporated herein, in toto, by reference.

In accordance with the present invention, an adhesion-enhancing amount of at least one adhesion promoting material (adhesion promoter), e.g., an organic adhesion promoting material, is incorporated into the acrylate-based film (AB film) that is appended to the polymeric photochromic coating. By adhesion-enhancing amount is meant that the compatibility of the acrylate-based film to a superimposed organo silane-containing abrasion-resistant coating (as described herein) appended to the acrylate-based film is enhanced. Typically, from 0.1 to 20 weight percent of the adhesion promoter(s) is incorporated into the acrylate-based composition prior to placing the AB composition on the photochromic coating and curing the resultant AB film. More particularly, from 0.5 to 16, e.g., 0.5 to 10 weight percent, more particularly 0.5 to 8, e.g., 5 weight percent, of the adhesion promoter is incorporated into the acrylate-based film. The amount of adhesion promoter incorporated into the AB film can range between any combination of these values, inclusive of the recited values.

Among the adhesion promoter materials that can be incorporated into the AB film to enhance its compatibility with an abrasion-resistant coating, e.g., an abrasion-resistant coating comprising organo-silane material, include, but are not limited to, adhesion promoting organo-silane materials, such as aminoorganosilane materials, silane coupling agents, organic titanate coupling agents and organic zirconate coupling agents.

Aminoorganosilanes that can be used are primary, secondary and tertiary aminoorganosilanes, particularly aminoorganosilanes represented by the following general formula I:

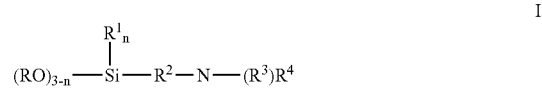

wherein n is an integer of from 0 to 2, usually 0 or 1; each R is independently chosen from $C_1$-$C_8$ alkyl, usually $C_1$-$C_4$ alkyl, such as methyl, ethyl, propyl and butyl, a $C_1$-$C_4$ alkoxy $C_1$-$C_8$ alkyl, typically $C_1$-$C_3$ alkoxy $C_1$-$C_3$ alkyl, such as methoxymethyl, methoxyethyl, ethoxymethyl, etc., or $C_6$-$C_{10}$ aryl, e.g., $C_6$-$C_8$ aryl; $R^1$ is hydrogen, a $C_1$-$C_8$ alkyl, usually $C_1$-$C_3$ alkyl, or $C_6$-$C_{10}$ aryl, e.g., $C_6$-$C_8$ aryl; $R^2$ is a divalent $C_1$-$C_{10}$ alkylene, $C_2$-$C_{10}$ alkenylene or phenylene, usually a $C_2$-$C_5$ alkylene, such as ethylene, trimethylene, etc., or $C_2$-$C_5$ alkenylene, such as vinylene, 1-propenylene, butenylene, 2-pentenylene, etc.; each $R^3$ and $R^4$ are independently chosen from hydrogen, $C_1$-$C_8$ alkyl, usually $C_1$-$C_3$ alkyl, $C_1$-$C_8$ hydroxyalkyl, usually $C_2$-$C_3$ hydroxyalkyl, $C_1$-$C_8$ aminoalkyl, usually $C_2$-$C_3$ aminoalkyl, $C_4$-$C_7$ cycloalkyl, e.g., $C_5$-$C_6$ cycloalkyl, $C_6$-$C_{10}$ aryl, e.g., $C_6$-$C_8$ aryl, (meth)acryloxy $C_1$-$C_4$ alkyl (the alkyl group being optionally substituted with a functional group such as hydroxy), e.g., (meth)acryloxy-2-hydroxypropyl, or $R^3$ and $R^4$ combine to form a cycloalkyl group of from 4 to 7 carbon atoms, e.g., 5 to 6 carbon atoms, or a $C_4$-$C_7$ heterocyclic group wherein the hetero atom(s) are oxygen and/or nitrogen, e.g., morpholino and piperazino, or are a group represented by the general formula IA

wherein R, $R^1$, $R^2$ and n are as defined with respect to general formula I. Also included in the compounds of formula I are the partial and total hydrolysates of compounds represented by that formula.

Non-limiting examples of aminosilanes that can be used include aminopropyl trimethoxysilane, aminopropyl triethoxysilane, aminoethyl trimethoxysilane, aminoethyl triethoxysilane, methylaminopropyl trimethoxysilane, aminobutylmethyl dimethoxysilane, aminopropyldimethyl methoxysilane, aminopropylmethyl dimethoxysilane, aminopropyldimethyl ethoxysilane, aminobutylmethyl dimethoxysilane, bis-(gamma-trimethoxysilylpropyl) amine, N-(3-methacryloxy-2-hydroxypropyl)-3-aminopropyl triethoxysilane, N-(3acryloxy-2-hydroxypropyl)-3-aminopropyl triethoxysilane, (N,N-dimethylaminopropyl) trimethoxysilane, (N,N-diethyl-3-aminopropyl) trimethoxysilane, diethylaminomethyl triethoxysilane, bis(2-hydroxyethyl)-3-aminopropyl triethoxysilane, γ-aminopropyl trimethoxysilane, N-(2'-aminoethyl)-3-aminopropyl trimethoxysilane, N-(2'-aminoethyl)-3-aminopropyl triethoxysilane, N-butyl-3-aminopropyl triethoxysilane, N-octyl-3-aminopropyl trimethoxysilane, N-cyclohexyl-3-aminopropyl triethoxysilane, N-(3'-triethoxysilylpropyl)-piperazine, bis-(3-triethoxysilylpropyl)amine, tris-(3-trimethoxysilylpropyl)amine, N,N-dimethyl-3-aminopropyl triethoxysilane, N-methyl-N-butyl-3-aminopropyl triethoxysilane, N-(3'-aminopropyl)-3-aminopropyl triethoxysilane, N-(3'-triethoxysilylpropyl) morpholine, N-phenyl-gamma-aminopropyl trimethoxysilane, and N-phenyl-gamma-amino-2-methylpropyl trimethoxysilane.

Silane coupling agents can be represented by the following general formula:

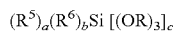

$(R^5)_a(R^6)_b Si [(OR)_3]_c$    II wherein each $R^5$ is an organofunctional group independently chosen from epoxy, glycidoxy, amino, vinyl, styryl, (meth)acryloxy, mercapto, ureido, haloalkyl, e.g., chloroalkyl, or a hydrocarbon radical having not more than 10 carbon atoms substituted with said organofunctional group; each $R^6$ is a hydrocarbon radical of not more than 20 carbon atoms, that is independently chosen from aliphatic radicals, aromatic radicals or mixtures of such hydrocarbon radicals, e.g., $C_1$-$C_{20}$ alkyl, more particularly, $C_1$-$C_{10}$ alkyl, e.g., $C_1$-$C_6$ alkyl, or phenyl; each R is independently chosen from $C_1$-$C_8$ alkyl, usually $C_1$-$C_4$ alkyl, such as methyl, ethyl, propyl and butyl, a $C_1$-$C_4$ alkoxy $C_1$-$C_8$ alkyl, typically $C_1$-$C_3$ alkoxy $C_1$-$C_3$ alkyl, such as methoxymethyl, methoxyethyl, ethoxymethyl, etc., $C_6$-$C_{10}$ aryl, e.g., $C_6$-$C_8$ aryl, or acetoxy; a is the integer 1 or 2, usually 1, b is the integer 0, 1 or 2, e.g., 0, and c is the integer 1, 2, or 3, e.g., 2 or 3, provided that the sum of a+b+c equals 4.

Non-limiting examples of silane coupling agents include: vinyl triacetoxysilane, vinyl trimethoxysilane, vinyl tri(2-methoxyethoxy)silane, vinyl triphenoxysilane, vinyl triisopropoxysilane, vinyl tri-t-butoxysilane, divinyl diethoxysilane, gamma glycidoxypropyl trimethoxysilane, beta-(3,4-epoxycyclohexyl)-ethyl trimethoxysilane, allyl triethoxysilane, allyl trimethoxysilane, (3-acryloxypropyl) dimethylmethoxysilane, (3-acryloxypropyl) methyldimethoxysilane, (3-acryloxypropyl) trimethoxysilane, (3-methacryloxypropyl) trimethoxysilane, (methacryloxymethyl) dimethyl ethoxysilane, methacryloxymethyl triethoxysilane, methacryloxymethyl trimethoxysilane, methacryloxypropyl dimethyl ethoxysilane, methacryloxypropyl trimethoxysilane, styrylethyl trimethoxysilane, mercaptomethyl methyldiethoxysilane, 3-mercaptopropyl methyldimethoxysilane, 3-mercaptopropyl triethoxysilane, 3-mercaptopropyl trimethoxysilane; 3,4-epoxy cyclohexylethyl trimethoxysilane, dimethyl diethoxysilane, chloropropyl triethoxysilane, ureidopropyl triethoxysilane, 3-(trimethoxysilyl) propyl methacrylate, mixtures of such silane materials, and at least partial hydrolysates of such silanes.

Non-limiting examples of organic titanate coupling agents include: tetra (2,2-diallyloxymethyl)butyl titanate, di(ditridecyl)phosphito titanate (commercially available as KR 55 from Kenrich Petrochemicals, Inc.); neopentyl(diallyl)oxy trineodecanoyl titanate; neopentyl (diallyl)oxy tri(dodecyl) benzene-sulfonyl titanate; neopentyl (diallyl)oxy tri(dioctyl) phosphato titanate; neopentyl (diallyl)oxy tri(dioctyl) pyrophosphato titanate; neopentyl (diallyl)oxy tri (N-ethylenediamino)ethyl titanate; neopentyl (diallyl)oxy tri (m-amino) phenyl titanate; neopentyl (diallyl)oxy trihydroxy caproyl titanate; isopropyl dimethyacrylisostearoyl titanate; tetraisopropyl (dioctyl) phosphito titanate; mixtures of such titanates, and at least partial hydrolysates thereof.

Non-limiting examples of organic zirconate coupling agents include tetra (2,2-diallyloxymethyl)butyl di(ditridecyl)phosphito zirconate (commercially available as KZ 55 from Kenrich Petrochemicals); neopentyl(diallyloxy) trineodecanoyl zirconate; neopentyl(diallyl)oxy tri(dodecyl)benzene sulfonyl zirconate; neopentyl(diallyloxy) tri(dioctyl) phosphato zirconate; neopentyl (diallyloxy) tri(dioctyl)pyrophosphato zirconate; neopentyl(diallyloxy) tri(N-ethylenediamino)ethyl zirconate; neopentyl (diallyloxy), tri (m-amino)phenyl zirconate; neopentyl (diallyloxy) trimethacryl zirconate; neopentyl (diallyloxy) triacryl zirconate; dineopentyl(diallyloxy) di(p-amino) benzoyl zirconate; dineopentyl (allyl)oxy di(3-mercapto) propionic zirconate; mixtures of such zirconates, and at least partial hydrolysates thereof.

As used in this specification and claims, the term "at least partial hydrolysates" is intended to mean and include compounds that are hydrolyzed partially or hydrolyzed completely.

Rigid substrates to which the photochromic polymeric coating are applied can vary and include any rigid substrate that will support a photochromic polymeric coating. Non-limiting examples of such rigid substrates include: paper, glass, ceramics, wood masonry, textiles, metals and organic polymeric materials. The particular substrate used will depend on the particular application that requires both a rigid substrate and a photochromic coating. In a desired embodiment, the rigid substrate is transparent. Polymeric substrates that can be used in preparing the photochromic articles of the present invention include organic polymeric materials and inorganic materials, such as glass. As used herein, the term "glass" is defined as being a polymeric substance, e.g., a polymeric silicate. Glass substrates can be of any type suitable for the intended purpose; but, are desirably a clear, low colored, transparent glass such as the well-known silica type of glass, particularly soda-line silica glass. The nature and composition of various silica glasses are well known in the art. The glass can be strengthened by either thermal or chemical tempering. Polymeric organic substrates that can be used to prepare the photochromic articles described herein, are any currently known (or later discovered) plastic materials that are chemically compatible with a photochromic polymeric coating applied to the surface of the substrate. Particularly contemplated are the art-recognized synthetic resins that are useful as optical substrates, e.g., organic optical resins that are used to prepare optically clear castings for optical applications, such as ophthalmic lenses.

Non-limiting examples of organic substrates that can be used as polymeric organic substrates are polymers, i.e., homopolymers, oligomers and copolymers, prepared from monomers and mixtures of monomers disclosed in U.S. Pat. No. 5,962,617 and in U.S. Pat. No. 5,658,501 from column 15, line 28 to column 16, line 17. Such organic substrates can be thermoplastic or thermoset polymeric substrates, e.g., transparent, desirably optically clear, substrates having a refractive index that desirably ranges from 1.48 to 1.74, e.g., 1.50 to 1.67.

Examples of such disclosed monomers and polymers include: polyol(allyl carbonate) monomers, e.g., allyl diglycol carbonates such as diethylene glycol bis(allyl carbonate), which monomer is sold under the trademark CR-39 by PPG Industries, Inc; polyurea-polyurethane (polyurea urethane) polymers, which are prepared, for example, by the reaction of a polyurethane prepolymer and a diamine curing agent, a composition for one such polymer being sold under the trademark TRIVEX by PPG Industries, Inc; polyol(meth)acryloyl terminated carbonate monomers; diethylene glycol dimethacrylate monomer; ethoxylated phenol methacrylate monomers; diisopropenyl benzene monomer; ethoxylated trimethylol propane triacrylate monomers; ethylene glycol bismethacrylate monomer; poly(ethylene glycol) bismethacrylate monomers; urethane acrylate monomers; poly (ethoxylated bisphenol A dimethacrylate) monomers; poly (vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanate(s) and/or isothiocyanate(s) with polythiols or polyepisulfide monomers, either homopolymerized or co-and/or terpolymerized with polythiols, polyisocyanates, polyisothiocyanates and optionally ethylenically unsaturated monomers or halogenated aromatic-containing vinyl monomers. Also contemplated are copolymers of such monomers and blends of the described polymers and copolymers with other polymers, e.g., to form interpenetrating network products. The exact chemical nature of the organic substrate is not critical to the present invention. However, the organic polymeric substrate should be chemically compatible with the photochromic polymeric coating applied to the surface of the substrate. For optical applications, the substrate should be transparent, preferably optically clear.

The polymeric organic substrate used to prepare the photochromic articles of the present invention can have a protective coating, e.g., an abrasion-resistant coating, on its surface. For example, commercially available thermoplastic polycarbonate optical lenses are typically sold with an abrasion-resistant coating, e.g., a hard coat, already applied to its surface(s) because the surface tends to be readily scratched, abraded or scuffed. An example of such a lens is the Gentex polycarbonate lens (available from Gentex Optics) that is sold with a hard coat already applied to the polycarbonate surface. As used in this disclosure and claims, the terms "polymeric organic substrate" (or claims of similar import) or "surface" of such a substrate, is intended to mean and include either the polymeric organic substrate itself or such a substrate with a coating, e.g., protective coating and/or primer, on the substrate. Thus, when reference is made in this disclosure or claims to applying a primer coating or photochromic polymeric coating to the surface of the substrate, such reference includes applying such a coating to the polymeric organic substrate per se or to a coating, e.g., an abrasion-resistant coating or primer on the surface of the substrate. Hence, the term "substrate" includes substrates having a protective coating and/or primer on its surface. The coating can be any suitable coating and is not limited to an abrasion-resistant coating (hard coat), e.g., any protective coating, primer, coating or even a coating that provides additional functional properties to the article of which the substrate is a part.

The use of photochromic organic coatings on plastic substrates, particularly plastic substrates such as thermoplastic polycarbonates, has been described. In accordance with the present invention, any organic polymeric material that can be used as a coating with the chosen organic substrate and which will function as a host material for the organic photochromic materials/compounds selected for use can be used. Normally, the host organic polymeric coating has sufficient internal free volume for the photochromic material to function efficiently, e.g., to change from a colorless form to a colored form that is visible to the naked eye in response to ultraviolet (UV) radiation, and to change back to the colorless form when the UV radiation is removed. Otherwise, the precise chemical nature of the organic coating that is used as the host material for the photochromic material(s) is not critical.

Non-limiting examples of such organic polymeric materials include polyurethane-based coatings, such as those described in U.S. Pat. Nos. 6,107,395 and 6,187,444 B1, and International Patent Publication WO 01/55269; polyurea urethane-based coatings as those described from column 2, line 27 to column 18, line 67 in U.S. Pat. No. 6,531,076B2; epoxy resin-based coatings, such as those described in U.S. Pat. No. 6,268,055 B1; acrylic/methacrylic monomer-based coatings, such as those described in International Patent Publication WO 01/02449 A3, which is entitled, "Poly(Meth)Acrylic Photochromic Coating"; International Patent Publications WO 96/37593 and WO 97/06944, and U.S. Pat. Nos. 5,621, 017 and 5,776,376; aminoplast, e.g., melamine type, resins, such as those described in International Patent Publication WO 00/36048, which is entitled "Aminoplast Resin Photochromic Coating Composition and Photochromic Articles"; coatings comprising hydroxyl-functional components and polymeric anhydride-functional components, i.e., polyanhydride coatings, such as those described in International Patent Publication WO 00/34410, which is entitled "Polyanhydride Photochromic Coating Composition and Photochromic Articles"; and coatings comprising N-alkoxymethyl(meth) acrylamide functional polymers, such as those described in U.S. Pat. No. 6,060,001, which is entitled "Alkoxyacrylamide Photochromic Coating Composition and Photochromic Articles".

Of particular interest are photochromic polyurethane-based coatings, photochromic polyurea urethane-based coatings, photochromic polyacrylic or polymethacrylic-based coatings [referred to collectively as poly(meth)acrylic-based coatings], photochromic aminoplast resin-based coatings and photochromic epoxy resin-based coatings. Of special interest are the optically clear photochromic polyurethane, epoxy, polyurea urethane and poly(meth)acrylic-based coatings for use on transparent, e.g., optically clear, plastic substrates for ophthalmic applications, such as plano and vision correcting ophthalmic lenses, sun lenses and goggles, commercial and residential windows, automotive and aircraft transparencies, helmets, plastic sheeting, clear films, etc.

The term "transparent", as used in this disclosure and claims in connection with a substrate, film, material or coating, is intended to mean that the indicated coating, film, substrate or material, such as the plastic substrate, the non-activated photochromic coating, the radiation-cured acrylate-based film, and coatings superimposed or superposed on the radiation-cured acrylate-based film, have a light transmission of at least 70%, typically at least 80%, and more typically at least 85%. By the term "optically clear", as used in this disclosure and claims, is meant that the specified item has a light transmission that satisfies commercially accepted and regulatory values for optical, e.g., ophthalmic, articles.

Polyurethanes that can be used to prepare a photochromic polyurethane coating are those produced by the reaction of an organic polyol component and an isocyanate component, as more fully described in column 3, line 4 through column 6, line 22 of U.S. Pat. No. 6,187,444 B1. More particularly, the polyurethanes are produced from a combination of at least one hard segment producing organic polyol and at least one soft segment producing organic polyol. Generally, the hard segment results from the reaction of the isocyanate and a chain extender; and the soft segment results from the reaction of the isocyanate with a polymer backbone component such as a polycarbonate polyol, a polyester polyol or a polyether polyol, or mixtures of such polyols. The weight ratio of hard segment producing polyols to soft segment-producing polyols can vary from 10:90 to 90:10.

The relative amounts of the components comprising the polyurethane reaction mixture can be expressed as a ratio of the available number of reactive isocyanate groups to the available number of reactive hydroxyl groups, e.g., a ratio of NCO:OH groups of from 0.3:1.0 to 3.0:1.0.

The isocyanate component can be an aliphatic, aromatic, cycloaliphatic or heterocyclic isocyanate, or mixtures of such isocyanates. Typically, the isocyanate component is selected from blocked or unblocked aliphatic or cycloaliphatic isocyanates, or mixtures of such isocyanates.

As further described in U.S. Pat. No. 6,107,395, polyurethanes used as the photochromic host material can be prepared from an isocyanate reactive mixture comprising (i) from 40 to 85 weight percent of one or more polyols having a nominal functionality of from 2 to 4 and molecular weights of from 500 to 6000 g/mole, (ii) from 15 to 60 weight percent of one or more diols or triols or mixtures thereof having a functionality of from 2 to 3 and molecular weights of from 62 to 499, and (iii) an aliphatic polyisocyanate having a functionality of less than 3, e.g., 2.

The previously mentioned International Patent Publication WO 01/02449 A3 describes reaction mixtures for poly(meth) acrylic host materials for photochromic materials as comprising at least two difunctional (meth)acrylate monomers, which can have from greater than 3 to less than 15 alkoxy units. In one embodiment, a difunctional (meth)acrylate has the reactive acrylate groups connected by a straight or branched chain alkylene group, which usually contains from 1 to 8 carbon atoms; while a second difunctional (meth)acrylate has the reactive acrylate groups connected by ethylene oxide, propylene oxide, butylene oxide or mixtures of such oxide groups in random or block order.

Epoxy resin-based coatings described in U.S. Pat. No. 6,268,055 B1 are those prepared by the reaction of a composition comprising an epoxy resin or polyepoxide, e.g., polyglycidyl ethers of aliphatic alcohols and phenols, epoxy-containing acrylic polymers, polyglycidyl esters of polycarboxylic acids and mixtures of such epoxy-containing materials, with a curing agent, e.g., a polyacid comprising a half-ester formed from reacting an acid anhydride with an organic polyol.

Aminoplast resin-based coatings are described in U.S. Pat. Nos. 6,432,544 B1 and 6,506,488. These coatings are the reaction product of material(s) having at least two different functional groups chosen from hydroxyl, carbamate, urea or mixtures of such functional groups, and an aminoplast resin, e.g., a crosslinking agent. Materials having at least two different functional groups are described in the '444 patent from column, line 40 through column 12, line 23, and in the preceding disclosure with respect to the aminoplast tie layer. The aminoplast resin is a condensation product of an amine or amide with an aldehyde, e.g., formaldehyde, acetaldehyde, crotonaldehyde, benzaldehyde and furfural. The amine or amide can be melamine, benzoguanamine, glycoluril, urea and similar compounds. Melamine is typically used. Typically, the animoplast resin has at least two reactive groups. Non-limiting examples of aminoplast resins are described in the '444 patent in column 12, lines 49 to 67.

The amount of photochromic coating applied to at least one surface of the plastic substrate is that amount which provides a sufficient quantity of organic photochromic material to produce a coating that exhibits a desired change in optical density ($\Delta OD$) when the cured coating is exposed to ultraviolet (UV) radiation, i.e., a photochromic amount. Typically, the change in optical density measured at 22° C. (72° F.) after 30 seconds of UV exposure is at least 0.05, more typically at least 0.15, and still more typically at least 0.20. The change in optical density after 15 minutes of UV exposure is typically at least 0.10, more typically at least 0.50, and still more typically at least 0.70.

Stated differently, the amount of active photochromic material used in the photochromic coating can range from 0.5 to 40.0 weight percent, based on the total weight of monomer(s)/resin(s) used to produce the coating. The relative amounts of photochromic material(s) used will vary and depend in part upon the relative intensities of the color of the activated form of the photochromic compound(s), the ultimate color desired, and the solubility or dispersibility of the photochromic material(s) in the polymeric coating. Typically, the concentration of active photochromic material(s) within the photochromic coating ranges from 1.0 to 30 weight percent, more typically, from 3 to 20 weight percent, and still more typically, from 3 to 10 weight percent (based on the total weight of monomer(s)/resin(s) used to produce the coating.) The amount of photochromic material in the coating can range between any combination of these values, inclusive of the recited values.

The bleach rate of the photochromic coating, as reported in terms of the fading half-life (T ½), is typically not more than 500 seconds, more typically not more than 190 seconds, and still more typically not more than 115 seconds. The half-life bleach rate is the time interval in seconds for the change in optical density ($\Delta OD$) of the activated form of the photochromic coating to reach one half the highest $\Delta OD$ after removal of the source of activating light. The aforedescribed values for change in optical density and bleach rate are measured at 22° C. (72° F.).

The photochromic coating applied to the surface of the substrate will typically have a thickness of at least 3 microns, more typically at least 5 microns, still more typically, at least 10 microns, e.g., at least 20 or 30 microns. The applied photochromic coating will also usually have a thickness of not more than 200 microns, more usually not more than 100 microns, and most usually not more than 50 microns, e.g., not more than 40 microns. The thickness of the photochromic coating can range between any combinations of these values, inclusive of the recited values. For example, the photochromic coating can range from 10 to 50 microns, e.g., 20 to 40 microns. The applied photochromic coating should most desirably be free of cosmetic defects, such as scratches, pits, spots, cracks, inclusions, etc.

Typically, the term "coating" is considered by those knowledgeable in the coating art to be a layer having a thickness of not more than 4 mils (about 100 microns). However, as used in this specification and claims in relation to the photochromic coating, the term coating is defined herein as having a thickness, such as a thickness defined hereinabove. Further, as used in this specification and claims, it is intended that the term "surface of the polymeric substrate" or like terms, i.e., the surface to which the photochromic polymeric coating is applied, include the embodiment in which only at least a portion of the surface of the substrate is coated. Hence, the photochromic coating (and the acrylate-based film applied to the photochromic coating) may cover only a portion of a surface of the substrate, but typically it is applied to the entire surface of at least one substrate surface.

The hardness of the photochromic coating is not critical, but after application and curing, should usually be hard enough to be physically/mechanically handled without causing blemishes, e.g., scratches, in the coating. The hardness of the photochromic coating typically is less than the radiation-cured acrylate-based film applied to the photochromic coating, which in turn is typically softer than the abrasion-resistant (hard coat) coating applied to the radiation-cured acrylate-based film. Thus, the principal coatings applied to the plastic substrate (not including any primer layer that may be applied to the substrate) increase in hardness in the direction of the abrasion-resistant coating. This gradient in hardness for the foregoing coatings/film can be quantified by performing the Bayer Abrasion Test (described hereinafter) on each of the coatings. The values obtained by the Bayer Abrasion Test are a ratio (Bayer haze gain ratio), which indicates the relative amount of haze developed in the coating compared to a standard. The hardness gradient will be evidenced by an increasing Bayer ratio starting with the inner photochromic coating and ending with the outer abrasion resistant coating, the Bayer ratio of the acrylate-based film being intermediate to the Bayer ratio of the photochromic coating and the abrasion-resistant coating.

The Fischer microhardness of organic photochromic coatings has been described in published patent literature as typically being at least 40 or 50 Newtons per mm$^2$, typically at least 60 or 70 Newtons per mm$^2$, and as usually less than 150 Newtons per mm$^2$, more usually less than 130, still more usually less than 120, e.g., 100, Newtons per mm$^2$. In accordance with the present invention, the Fischer microhardness of the photochromic coating can be less than 40, e.g., less than 30, in some instances less than 25 and in other instances less than 15, such as 2 or 5, and can be in the lower portion of the ranges described herein, e.g., from 2 to 40 or 80, more particularly from 2 to 25, such as 10 to 15, e.g., 12, Newtons per mm$^2$. This lower range of hardness allows the electrocyclic mechanism discussed previously in relation to photochromic materials to occur with greater efficiency than at higher hardness values, and results in lower bleach rate values for the photochromic materials compared to bleach rates observed with photochromic coatings of higher hardness values. The Fischer microhardness of photochromic coatings can range between any combinations of the stated values, inclusive of the recited values. Fischer microhardness values can be measured with a Fischerscope HCV Model H-100 (available from Fischer Technology, Inc.) by taking 3 measurements in the center area of the test sample under conditions of a 100 milliNewton load, 30 load steps, and 0.5 second pauses between load steps at an indentor (Vickers diamond stylus) depth of 2 μm (microns).

Photochromic materials, e.g., photochromic dyes/compounds or compositions containing such dye/compounds, that can be utilized for the photochromic coating applied to the rigid substrate are inorganic and/or organic photochromic compounds and/or substances containing such organic photochromic compounds that are currently known to those skilled in the art, or which are later discovered. The particular photochromic material(s), e.g., compound(s), selected is not critical, and its/their selection will depend on the ultimate application and the color or hue desired for that application. When two or more photochromic compounds are used in combination, they are generally chosen to complement one another to produce a desired color or hue.

Organic photochromic compounds used in the photochromic coating commonly have at least one activated absorption maxima within the visible spectrum of between 300 and 1000, e.g., between 400 and 700, nanometers. The organic photochromic material(s) is incorporated, e.g., dissolved or dispersed, in the photochromic coating, and color when activated, i.e., when exposed to ultraviolet radiation, the photochromic material(s) changes to the color or hue that is characteristic of the colored form of such material(s).

Inorganic photochromic materials typically comprise crystallites of silver halide, cadmium halide and/or copper halide. Generally, the halide material is the chloride and bromide. Other inorganic photochromic materials can be prepared by the addition of europium (II) and/or cerium (III) to a mineral glass, such as a soda-silica glass. In one embodiment, the inorganic photochromic material(s) are added to molten glass and formed into particles that are incorporated into the coating composition that is used to form the polymeric photochromic coating. Such inorganic photochromic materials are described in the *Kirk Othmer Encyclopedia of Chemical Technology*, 4$^{th}$ Edition, Volume 6, pps. 322-325.

In one contemplated embodiment, the organic photochromic component of the photochromic coating comprises:

(a) at least one photochromic organic compound having a visible lambda max of from 400 to less than 550, e.g., from 400 to 525, nanometers; and (b) at least one photochromic organic compound having a visible lambda max of greater than 525 or 550 nanometers, e.g., from 525 or 550 to 700 nanometers.

Non-limiting examples of photochromic compounds that can be used in the photochromic coating include benzopyrans, chromenes, e.g., naphthopyrans, such as, naphtho[1,2-b]pyrans, and naphtho[2,1-b]pyrans, spiro-9-fluoreno[1,2-b]pyrans, phenanthropyrans, quinopyrans, and indeno-fused naphthopyrans, such as those disclosed in U.S. Pat. No. 5,645,767 at column 1, line 10 to column 12, line 57, and U.S. Pat. No. 5,658,501 at column 1, line 64 to column 13, line 36 Additional photochromic compounds that can be used include the oxazines, such as benzoxazines, naphthoxazines, and spiro(indoline)pyridobenzoxazines. Other non-limiting photochromic substances contemplated for use herein are photochromic metal dithizonates, e.g., mercury dithizonates, which are described in, for example, U.S. Pat. No. 3,361,706; fulgides and fulgimides, e.g. the 3-furyl and 3-thienyl fulgides and fulgimides, which are described in U.S. Pat. No. 4,931,220 at column 20, line 5 through column 21, line 38; diarylethenes, which are described in U.S. Patent Application 2003/0174560 from paragraphs [0025] to [0086]; and mixtures of any of the aforementioned photochromic materials/compounds.

Further non-limiting examples of photochromic compounds, polymerizable photochromic compounds and complementary photochromic compounds are described in the following U.S. Patents:

U.S. Pat. No. 5,166,345 at column 3, line 36 to column 14, line 3;

U.S. Pat. No. 5,236,958 at column 1, line 45 to column 6, line 65;

U.S. Pat. No. 5,252,742 at column 1, line 45 to column 6, line 65;

U.S. Pat. No. 5,359,085 at column 5, line 25 to column 19, line 55;

U.S. Pat. No. 5,488,119 at column 1, line 29 to column 7, line 65;

U.S. Pat. No. 5,821,287 at column 3, line 5 to column 11, line 39;

U.S. Pat. No. 6,113,814 at column 2, line 23 to column 23, line 29;

U.S. Pat. No. 6,153,126 at column 2, line 18 to column 8, line 60;

U.S. Pat. No. 6,296,785 at column 2 line 47 to column 31, line 5;

U.S. Pat. No. 6,348,604 at column 3, line 26 to column 17, line 15; and

U.S. Pat. No. 6,353,102 at column 1, line 62 to column 11, line 64.

Spiro(indoline)pyrans are also described in the text, *Techniques in Chemistry*, Volume III, "Photochromism", Chapter 3, Glenn H. Brown, Editor, John Wiley and Sons, Inc., New York, 1971. In addition, it is contemplated that organic photochromic materials such as photochromic pigments and photochromic compounds encapsulated in metal oxides can be used in the photochromic coating. See, for example, the materials described in U.S. Pat. Nos. 4,166,043 and 4,367,170.

The photochromic coating of the present invention can contain one photochromic compound or a mixture of two or more photochromic compounds, as desired. Mixtures of photochromic compounds can be used to attain certain activated colors such as a near neutral gray or near neutral brown. See, for example, U.S. Pat. No. 5,645,767, column 12, line 66 to column 13, line 19, which describes the parameters that define neutral gray and brown colors.

The photochromic compound(s) described herein can be incorporated into the curable coating composition by addition to the coating composition and/or by dissolving the compound(s) in a solvent before being added to the curable coating composition. Alternatively, although more involved, the photochromic compound(s) can be incorporated into the cured polymer coating by imbibition, permeation, diffusion or other transfer methods, which methods are known to those skilled in the art of dye transfer into host materials.

In addition to photochromic materials, the photochromic coating (or precursor formulation) can contain additional conventional adjuvants that impart desired properties or characteristics to the coating, or which are required by the process used to apply and cure the photochromic coating on the surface of the plastic substrate, or which enhance the performance of the coating. Such adjuvants include, but are not limited to, heat stabilizers, rheology control agents, leveling agents, e.g., surfactants, free radical scavengers and adhesion promoting agents, such as trialkoxy silanes, e.g., silanes having an alkoxy radical of 1 to 4 carbon atoms, including γ-glycidoxypropyl trimethoxy silane, γ-aminopropyl trimethoxysilane, 3,4-epoxy cyclohexylethyl trimethoxysilane, dimethyldiethoxysilane, aminoethyl trimethoxysilane, and 3-(trimethoxysilyl)propyl methacrylate ultraviolet light absorbers, light stabilizers, such as hindered amine light stabilizers (HALS), asymmetric diaryloxalamide (oxanilide) compounds, singlet oxygen quenchers, e.g., a nickel ion complex with an organic ligand, antioxidants, e.g., polyphenolic antioxidants and mixtures of such photochromic performance enhancing adjuvant materials. See, for example, the materials described in U.S. Pat. Nos. 4,720,356, 5,391,327 and 5,770,115.

Compatible (chemically and color-wise) tints, i.e., dyes, can also be added to the photochromic coating formulation or applied to the plastic substrate for medical reasons or for reasons of fashion, e.g., to achieve a more aesthetic result. The particular dye selected can vary and will depend on the aforesaid need and result to be achieved. In one embodiment, the dye can be selected to complement the color resulting from the activated photochromic materials used, e.g., to achieve a more neutral color or absorb a particular wavelength or incident light. In another contemplated embodiment, the dye can be selected to provide a desired hue to the substrate and/or coating when the photochromic coating is in an unactivated state.

The photochromic coating composition can be applied to the surface of the plastic substrate as a polymerizable formulation and then cured (polymerized) by methods well known to those skilled in the art including, but not limited to, photopolymerization, thermal polymerization, infrared polymerization, and other sources of radiation. Such application methods include but are not limited to the art-recognized methods of spin coating, curtain coating, dip coating, spray coating or by methods used in preparing overlays. Such methods are described in U.S. Pat. No. 4,873,029.

When applied as a polymerizable formulation, the photochromic coating formulation will also typically contain a catalyst or polymerization initiator. The amount of catalyst/polymerization initiator(s) used to polymerize the polymerizable components of the photochromic coating formulation can vary and will depend on the particular initiator and the polymerizable monomers used. Typically, only that amount that is required to initiate (catalyze) and sustain the polymerization reaction is required, i.e., an initiating or catalytic amount. Generally, from 0 to 10 weight percent, e.g., from 0.01 to 8 weight percent, more typically from 0.1 to 5 weight percent, based on the total weight of the polymerizable monomer(s) in the formulation, of at least one catalyst and/or polymerization initiator, including photoinitiators is used. The amount of catalyst/initiator can range between any combinations of the aforestated values, inclusive of the recited values. The catalyst(s)/initiator(s) will be selected from those materials that can be used to polymerize the particular monomer(s) used to produce the polymeric coating chosen as the photochromic host, and that will not impair significantly the function of the photochromic materials that may be included in the coating formulation.

For example, catalysts that can be used to cure polyurethane reaction mixtures can be selected from the group consisting of Lewis bases, Lewis acids and insertion catalysts described in Ullmann's Encyclopedia of Industrial Chemistry, $5^{th}$ Edition, 1992, Volume A21, pp. 673 to 674. Usually the catalyst is an organo tin catalyst, e.g., tin octylate, dibutyl tin dilaurate, dibutyl tin diacetate, dibutyl tin mercaptide, dibutyl tin dimaleate, dimethyl tin diacetate, dimethyl tin dilaurate and 1,4-diazabicyclo[2.2.2]octane. Mixtures of tin catalysts can be used. Other tin catalysts described in the art can be used as well.

Epoxy resin coating compositions typically contain a polyacid curing agent having a high average acid functionality, i.e., two or more acid groups per molecule. Typically, the acid group is a carboxylic acid group. Non-limiting examples of polycarboxylic acids include dicarboxylic acids such as oxalic, malonic, succinic, tartaric, glutaric, adipic, sebacic, maleic, fumaric, phthalic, isophthalic, terephthalic, and dodecanedioc acids; tricarboxylic acids such as citric acid; and tetracarboxylic acids such as 1,2,3,4-butane tetracarboxylic acid.

Polyanhydride coating compositions typically contain an amine compound as the curing catalyst. Non-limiting examples of amine compounds include dimethyl cocoamine, dimethyl dodecylamine, triethylamine, triethanolamine and phenolic compounds containing at least two dialklyamino groups. Aminoplast resin and alkoxyacrylamide polymer coating compositions commonly contain an acidic material as a catalyst. Non-limiting examples include phosphoric acid or substituted phosphoric acids, such as alkyl acid phosphate and phenyl acid phosphate; and sulfonic acids or substituted sulfonic acids, such as para-toluene sulfonic acid, dodecylbenzene sulfonic acid and dinonylnaphthalene sulfonic acid.

Acrylic/methacrylic monomer-based coating compositions can contain thermal initiators, e.g., initiators that produce free radicals, such as organic peroxy compounds or azobis(organonitrile) compounds, photoinitiators or mixtures of such initiators.

Non-limiting examples of suitable organic peroxy compounds include peroxymonocarbonate esters, such as tertiarybutylperoxy isopropyl carbonate; peroxydicarbonate esters, such as di(2-ethylhexyl) peroxydicarbonate, di(secondary butyl) peroxydicarbonate and diisopropyl peroxydicarbonate; diacyl peroxides, such as 2,4-dichlorobenzoyl peroxide, isobutyryl peroxide, decanoyl peroxide, lauroyl peroxide, propionyl peroxide, acetyl peroxide, benzoyl peroxide, p-chlorobenzoyl peroxide; peroxyesters, such as t-butylperoxy pivalate, t-butylperoxy octylate, and t-butylperoxy isobutyrate; methylethylketone peroxide; and acetylcyclohexane sulfonyl peroxide.

Non-limiting examples of suitable azobis(organonitrile) compounds include azobis(isobutyronitrile), 2,2'-azobis(2,4-dimethylpentanenitrile), 1,1'-azobiscyclohexanecarbonitrile, and azobis(2,4-dimethylvaleronitrile) and mixtures of such azo thermal initiators. Desired thermal initiators are those that do not discolor the resulting coating or decompose the photochromic material incorporated within the polymerizable coating composition.

Photopolymerization is performed in the presence of at least one photoinitiator using ultraviolet light and/or visible light. Photoinitiators, which are free radical initiators, are classified in two major groups based upon their mode of action. Cleavage-type photoinitiators include acetophenones, α-aminoalkylphenones, benzoin ethers, benzoyl oximes, acylphosphine oxides and bisacylphosphine oxides. Abstraction-type photoinitiators include benzophenone, Michler's ketone, thioxanthone, anthraquinone, camphorquinone, fluorone and ketocoumarin. Abstraction-type photoinitiators function better in the presence of materials such as amines and other hydrogen donor materials added to provide labile hydrogen atoms for abstraction. Typical hydrogen donors have an active hydrogen positioned alpha to an oxygen or nitrogen, e.g., alcohols, ethers and tertiary amines, or an active hydrogen atom directly attached to sulfur, e.g., thiols. In the absence of such added materials, photoinitiation can still occur via hydrogen abstraction from monomers, oligomers or other components of the system.

Non-limiting examples of photopolymerization initiators that can be used include benzil, benzoin, benzoin methyl ether, benzoin isobutyl ether, benzophenol, acetophenone, benzophenone, 4,4'-dichlorobenzophenone, 4,4'-bis(N,N'-dimethylamino) benzophenone, diethoxyacetophenone, fluorones, e.g., the H-Nu series of initiators available from Spectra Group Limited, 2-hydroxy-2-methyl-1-phenylpropan-1-one, 1-hydroxycyclohexyl phenyl ketone, 2-isopropylthixantone, α-aminoalkylphenone, e.g., 2-benzyl-2-dimethylamino-1-(4-morpholinophenyl)-1-butanone,
acylphosphine oxides, such as 2,6-dimethyl benzoyldiphenyl phosphine oxide, 2,4,6-trimethylbenzoyldiphenyl phosphine oxide, 2,6-dichlorobenzoyldiphenyl phosphine oxide, and 2,6-dimethoxybenzoyldiphenyl phosphine oxide, bisacylphosphine oxides, such as bis(2,6-dimethyoxybenzoyl)-2,4,4-trimethylpentyl phosphine oxide, bis(2,6-dimethylbenzoyl)-2,4,4-trimethylpentyl phosphine oxide, bis(2,4,6-trimethylbenzoyl)-2,4,4-trimethylpentyl phosphine oxide, and bis(2,6-dichlorobenzoyl)-2,4,4-trimethylpentyl phosphine oxide, phenyl-4-octyloxyphenyliodonium hexafluoroantimonate, dodecyldiphenyliodonium hexafluoroantimonate, (4-(2-tetradecanol)oxyphenyl)-iodonium hexafluoroantimonate and mixtures thereof.

The source of radiation used for photopolymerization is selected from those sources that emit ultraviolet light and/or visible light. The source of radiation can be a mercury lamp, a mercury lamp doped with $FeI_3$ and/or $GaI_3$, a germicidal lamp, a xenon lamp, a tungsten lamp, a metal halide lamp or a combination of such lamps. Typically, the absorbance spectra of the photoinitiator(s) is matched with the spectral output of the light source bulb, e.g., an H bulb, D bulb, Q bulb and/or V bulb, for highest curing efficiency. The exposure time of the curable coating to the light source will vary depending upon the wavelength and intensity of the light source, the photoinitiator, and thickness of the coating. Generally, the exposure time will be sufficient to substantially cure the coating, or produce a coating that is cured sufficiently to allow physical handling followed by a post thermal cure. The photochromic coating can also be cured using an electron beam process that does not require the presence of a thermal or photoinitiator.

Solvents can also be present in the coating formulation in order to dissolve and/or disperse the components of the coating formulation. Typically, a solvating amount of solvent is used, i.e., an amount which is sufficient to solubilize/disperse the solid components in the coating formulation. Commonly, from 10 to 80 weight percent of solvent material, based on the total weight of the coating formulation, is used.

Suitable solvents include, but are not limited to, benzene, toluene, methyl ethyl ketone, methyl isobutyl ketone, acetone, ethanol, tetrahydrofurfuryl alcohol, propyl alcohol, propylene carbonate, N-methyl pyrrolidinone, N-vinyl pyrrolidinone, N-acetyl pyrrolidinone, N-hydroxymethyl pyrrolidinone, N-butyl pyrrolidinone, N-ethyl pyrrolidinone, N-(N-octyl)pyrrolidinone, N-(N-dodecyl)pyrrolidinone, 2-methoxyethyl ether, xylene, cyclohexane, 3-methyl cyclohexanone, ethyl acetate, butyl acetate, tetrahydrofuran, methanol, amyl propionate, methyl propionate, propylene glycol methyl ether, diethylene glycol monobutyl ether, dimethyl sulfoxide, dimethyl formamide, ethylene glycol, mono- and di-alkyl ethers of ethylene glycol and their derivatives, which are sold as CELLOSOLVE industrial solvents, and mixtures of such solvents.

In a further contemplated embodiment, the photochromic polymeric coating can be applied as a water-borne coating, i.e., as aqueous polymer dispersion, e.g., as a latex, with or without the presence of an organic solvent. This type of system is a two-phase system comprising an aqueous phase and an organic phase, which is dispersed in the aqueous phase. Use of water-borne coatings is well known in the art. See, for example, U.S. Pat. No. 5,728,769, which relates to aqueous urethane resins and coatings prepared from such resins, and the patents referred to in the '769 patent.

After the photochromic coating formulation is applied to the surface of the plastic substrate, it is cured (polymerized) by the application of heat (in the case of a thermal cure), and/or ultraviolet or electron beam radiation. The specific cure conditions used will depend on the plastic substrate, the polymerizable components in the formulation and the type of catalyst/initiator used, or in the case of electron beam radiation, the intensity of the electron beam. Thermal curing can involve heating from room temperature up to temperatures below which the plastic substrate is not damaged due to such heating. Temperatures up to 200° C. have been reported. Such cure conditions are well known in the art. For example, a typical thermal cure cycle involves heating the formulation from room temperature (22° C.) to from 85 to 125° C. over a period of from 2 to 20 minutes. The time required for ultraviolet or electron beam radiation cures is generally shorter than a thermal cure, e.g., from 5 seconds to 5 minutes, and will depend on the intensity (power) of the radiation. When the thermal or UV/electron beam cure conditions produce a coating that can be physically handled but is not completely cured, an additional thermal post cure step can also be employed to fully cure the photochromic coating.

Prior to applying the photochromic coating to the surface of the plastic substrate, it is common to clean and treat the surface of the substrate to provide a clean surface and a surface that will enhance adhesion of the photochromic coating to the substrate. Effective treatments include ultrasonic washing, cleaning with an aqueous mixture of organic solvent, e.g., a 50:50 mixture of isopropanol:water or ethanol: water, UV treatment, activated gas treatment, e.g., treatment with low temperature plasma or corona discharge (as described more fully hereinafter), and chemical treatment that results in hydroxylation of the substrate surface, i.e., etching of the surface with an aqueous solution of alkali metal hydroxide, e.g., sodium or potassium hydroxide, which solution can also contain a fluorosurfactant. Generally, the alkali metal hydroxide solution is a dilute aqueous solution, e.g., from 5 to 40 weight percent, more typically from 10 to 15 weight percent, such as 12 weight percent, alkali metal hydroxide. See, for example, U.S. Pat. No. 3,971,872, column 3, lines 13 to 25; U.S. Pat. No. 4,904,525, column 6, lines 10 to 48; and U.S. Pat. No. 5,104,692, column 13, lines 10 to 59, which describe surface treatments of polymeric organic materials.

In some cases, a primer coating is applied to the plastic surface substrate before application of the photochromic coating. The primer coating is interposed between the organic substrate and the photochromic polymeric coating, and serves as a barrier coating to prevent interaction of the polymeric coating components with the substrate and vice versa, and/or as an adhesive layer to promote adhesion of the photochromic coating to the plastic substrate. The primer can be applied to the plastic substrate by any of the methods used to apply the photochromic coating, e.g., spray, spin, spread, curtain, roll or dip coating; and may be applied to a cleaned and untreated or cleaned and treated, e.g., chemically treated, surface of the substrate. Primer coatings are well known to those skilled in the art. Selection of an appropriate primer coating will depend on the plastic substrate used and the particular photochromic coating, i.e., the primer coating must be chemically and physically compatible with the surface of the plastic substrate and the photochromic coating, while providing the functional benefits desired for the primer coating, i.e., barrier and adhesive properties.

The primer coating can be one or several monomolecular layers thick, and can range from 0.1 to 10 microns, more usually from 0.1 to 2 or 3 microns. The thickness of the primer can vary between any combination of the aforementioned values, inclusive of the recited values. One contemplated embodiment of a suitable primer coating comprises an organofunctional silane, such as methacryloxypropyl trimethoxysilane, a catalyst of a material that generates acid on exposure to actinic radiation, e.g., onium salts, and an organic solvent, such as diglyrne or isopropyl alcohol, as described in U.S. Pat. No. 6,150,430. A further example of a primer coating is described in U.S. Pat. No. 6,025,026, which describes a composition that is substantially free of organosiloxanes and which comprises organic anhydrides having at least one ethylenic linkage and an isocyanate-containing material.

In accordance with the present invention, a radiation-cured, adhesion promoter-containing acrylate-based film is superposed, e.g., superimposed, on the photochromic polymeric coating. The acrylate-based film can consist of a single layer or film, or comprise two or more layers/films of the same or different compositions.

The acrylate-based film can be prepared using acrylic or methacrylic monomers or a mixture of acrylic and/or methacrylic monomers (hereinafter referred to collectively as (meth)acrylic monomers). The mixture of (meth)acrylic monomers can include mono-, di-, tri-, tetra-, and penta-acrylic functional monomers. Additional co-polymerizable monomers, such as epoxy monomers, e.g., monomers containing an epoxy functionality, monomers containing both acrylic and epoxy functionalities, etc., can also be present in the formulation used to prepare the acrylate-based film, as described subsequently herein. The monomers used to prepare the acrylate-based film are comprised of a plurality, e.g., a major amount, i.e., more than 50 weight percent, of acrylic-functional monomers; hence the designation "acrylate-based film". The formulations used to prepare the acrylate-based film can also contain components having at least one isocyanate functionality, e.g., organic monoisocyanates and organic diisocyanates, thereby to incorporate polyurethane groups into the film. The acrylate-based film used in the present invention should possess the physical properties described above; namely, be transparent, adhere to the photochromic coating, be resistant to removal by aqueous alkali metal hydroxide, be compatible with an abrasion-resistant coating comprising organo silane that is applied to its surface, and be more scratch resistant than the photochromic coating, e.g., be harder than the photochromic coating. One skilled in the art can readily determine if the acrylate-based film meets these physical requirements by using standard test protocols, such as those described in this description.

Prior to applying the acrylate-based film to the photochromic coating, it is common to treat the surface of the photochromic coating to enhance adhesion of the acrylate-based film to the photochromic coating. Effective treatments include activated gas treatment, such as treatment with a low temperature plasma or corona discharge. A particularly desirable surface treatment is a low temperature plasma treatment. This method allows treatment of the surface to enhance adhesion of a superimposed film or coating, and is a clean and efficient way to alter the physical surface, e.g., by roughening and/or chemically altering the surface without affecting the rest of the article. Inert gases, such as argon, and reactive gases, such as oxygen, have been used as the plasma gas. Inert gases will roughen the surface, while reactive gases such as oxygen will both roughen and chemically alter slightly the surface exposed to the plasma, e.g., by producing hydroxyl or carboxyl units on the surface. Oxygen is used preferably as the plasma gas because it is believed that it provides a slight, but effective, physical roughening of the surface along with a slight, but effective, chemical modification of the surface. Naturally, the extent of the surface roughening and/or chemical modification will be a finction of the conditions of the plasma used, the plasma gas and the operating conditions of the plasma (including the length of time of the treatment).

It is reported that a conventional plasma treatment alters the top 20 to 200 angstroms of the surface (a few molecular layers.) The operating conditions of the plasma unit are a function of the design, size, e.g., volume of the plasma chamber, power and construction of the plasma unit. The frequency at which the plasma operates can vary, e.g., from a low frequency such as 40 kHz to microwave frequencies such as 2.45 GHz. Similarly, the power at which the plasma unit operates can vary, e.g., from 50 to 1000 Watts, e.g., 50 to 750, such as 50 to 150 Watts. The pressure at which the plasma unit operates can also vary; however, it has been observed that low pressures are generally less destructive physically of the treated surface, which is desired. Low pressures, e.g., from 20 to 65 or 70 Pa are believed to be useful. The time that the surface is exposed to the plasma can also vary and will be a function of the type of surface being treated, i.e., the type of polymer used for the photochromic polymeric coating. However, care should be taken that the surface is not treated for too long since lengthy periods of treatment can be counterproductive. One skilled in the art can readily determine the minimum time required to provide a plasma treated surface that enhances adhesion of the acrylate-based film to the photochromic coating. For ophthalmic articles, such as lenses, the length of the plasma treatment will generally vary from 1 to 10 minutes, e.g., 1 to 5 minutes.

The surface of the article subjected to plasma treatment will typically be at room temperature; however, if desired the surface can be preheated slightly. It should be noted that plasma treatment will tend to increase the temperature of the surface (and article) treated. Consequently, the temperature of the surface during treatment will be a direct function of the period of plasma treatment. The temperature of the surface to be subjected to a plasma treatment should be maintained at temperatures below that at which the surface is not significantly adversely affected (other than the intended increase in surface area by roughening and slight chemical modification.) One skilled in the art can readily select the operating conditions of the plasma unit, vis-à-vis, the substrate treated, to achieve an improvement in the adhesion of a superimposed film/coating on the plasma treated surface. Examination of the treated surface can be performed by atomic force microscopy to determine the relative extent of the physical change in the surface. Generally, a low temperature, microwave frequency, oxygen plasma can be used for treatment of a photochromic coating to which a radiation-cured acrylate-based film is applied.

As used herein, the terms "acrylic" and "acrylate" are used interchangeably and include derivatives of acrylic acids, as well as substituted acrylic acids such as methacrylic acid, ethacrylic acid, etc., unless clearly indicated otherwise. The terms "(meth)acrylic" or "(meth)acrylate" are intended to cover both the acrylic/acrylate and methacrylic/methacrylate forms of the indicated material, e.g., monomer. Since, the acrylate-based film is interposed between the photochromic coating and the abrasion-resistant coating, it serves to tie together these coatings and serves as a barrier to protect the photochromic coating. For simplicity, the acrylate-based film will hereinafter be referred to as either the ABF, AB film or tie layer.

Radiation curing of acrylate-based polymeric systems can utilize electron beam curing (EB) or ultraviolet light (UV) radiation. UV curing can require the presence of at least one photoinitiator (examples of which are disclosed elsewhere in this disclosure), whereas curing by EB techniques does not require a photoinitiator. With the exception of the presence or absence of the photoinitiator, the acrylate-based formulations, which are cured by either UV or EB radiation technology, can otherwise be identical.

Radiation-curable acrylate-based polymeric systems are well known in the polymeric art and any such system can be used to produce the AB film of the present invention, provided that the resultant film satisfies the physical requirements required for that film, which requirements are described elsewhere in this specification. A contemplated embodiment of the curable composition for the AB film comprises a combination or miscible blend of one or more free-radical initiated acrylate monomers and/or acrylate oligomers, and one or more cationic initiated epoxy monomers. When this blend of monomers is cured, a polymerizate comprising an interpenetrating network of polymer components is produced.

Examples of acrylate monomers include polyfunctional acrylates, e.g., di-, tri-, tetra-, and penta-functional acrylates, and monofunctional acrylates, e.g., a monomer containing a single acrylic functionality, hydroxy-substituted monoacrylates and alkoxysilyl alkylacrylates, such as trialkoxysilyl-propyhnethacrylate. Other reactive monomers/diluents, such as monomers containing an ethylenic functional group (other than the acrylic-functional materials) can also be present.

Many acrylates can be represented by the following general formula III,

wherein R is an aliphatic or aromatic group containing from 2 to 20 carbon atoms and optionally from 1 to 20 alkyleneoxy linkages; R' is hydrogen or an alkyl group containing from 1 to 4 carbon atoms, and n is an integer of 1 to 5. When n is greater than 1, R is a linking group that links the acrylic functional groups together. Typically, R' is hydrogen or methyl, and n is an integer of from 1 to 3. More specifically, diacrylates (when n is 2) can be represented by general formula IV

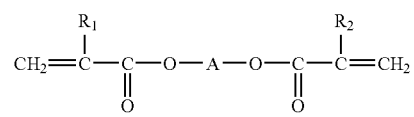

wherein $R_1$ and $R_2$ may be the same or different and are each chosen from hydrogen or alkyl groups containing from 1 to 4 carbon atoms, e.g., methyl, and A is a hydrocarbyl linking group of, for example, from 1 to 20 carbon atoms, e.g., an alkylene group, one or more oxyalkylene group(s) [or mixture of different oxyalkylene groups]; or a group of the following general formula V,

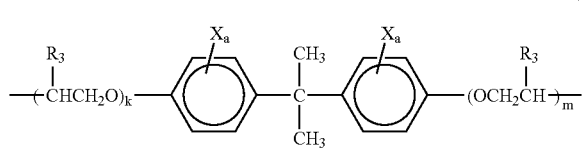

wherein each $R_3$ is a hydrogen atom or an alkyl group of from 1 to 4 carbon atoms, e.g., methyl; X is a halogen atom, e.g., chlorine; a is an integer of from 0 to 4, e.g., 0 to 1, representing the number of halogen atoms substituted on the benzene ring; and k and m are numbers of from 0 to 20, e.g., 1 to 15, or 2 to 10. The values of k and m are average numbers and when calculated can be a whole number or a fractional number.

Acrylates having an epoxy group can be represented by the following general formula VI,

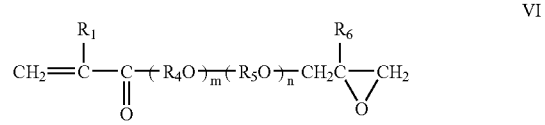

wherein $R_1$ and $R_6$ can be the same or different and are each chosen from hydrogen or an alkyl group of from 1 to 4 carbon atoms, e.g., methyl; $R_4$ and $R_5$ are alkylene groups containing from 2 to 3 carbon atoms, e.g., ethyleneoxy and propyleneoxy, and m and n are numbers of from 0 to 20, e.g., 0 or 1 to 15 or 2 to 10. When one of m and n is 0 and the other is 1, the remaining R group can be an aromatic group of the following formula VII,

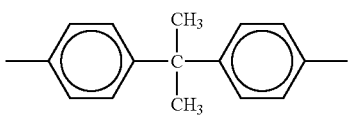

VII e.g., a group derived from the 2,2'-diphenylenepropane radical, which phenyl groups can be substituted with $C_1$ to $C_4$ alkyl groups or halogens, e.g., methyl and/or chlorine.

The amount, number and type of functional acrylates comprising the curable AB film formulation will vary and will depend on the physical properties of the film that are most desired since, for example, varying the cross-link density of the film, e.g., by varying the amount of tri-functional acrylates or other cross-linking monomers used in the AB film formulation, will alter the final properties of the film. It is generally accepted that the cross-link density of the cured film is a finction of the amount of multifunctional acrylates used. Large amounts of multifunctional acrylates lead to high hardness, tensile strength and chemical resistance, but with poorer adhesion to the substrate. In contrast, use of small amounts of multifunctional acrylates and increasing the amount of monofunctional acrylates lead to a lower cross-link density of the cured film with consequent lower hardness, chemical resistance and tensile strength, and a slower cure speed. Therefore, one skilled in the art can vary the amounts of mono- and multi-functional acrylate monomers used depending on whether it is desirable to optimize adhesion to the polymeric coating, hardness (scratch resistance), chemical resistance, e.g., resistance to aqueous alkali metal hydroxide treatment, or other properties; or whether it is desirable to compromise one or more of these properties to obtain an average benefit for all of those physical properties. One skilled in the art can readily select the combination of monomeric materials to be used for the AB film based on the art-recognized benefits that certain functional groups provide to a radiation-cured acrylate film, and the tests described in this specification that measure the desired physical properties.

Exemplary of acrylate-based tie layer formulations include those wherein diacrylate material(s) comprise from 0 to 80 weight percent, desirably from 0 or 3 to 60 weight percent, more desirably, from 10 or 15 to 45 or 55, e.g., 20 to 55 (particularly 25 to 35 or 45) weight percent, of the formulation. Desirably, the acrylate-based tie layer formulation contains at least one diacrylate material. The formulation also can contain one or more triacrylate materials, but if a triacrylate material is not used, then cross-linking can be provided by another monomer material in the formulation. Triacrylates can comprise from 0 to 25 or 30 weight percent, e.g., 0 or 5 to 15 or 30, or 10 or 15 to 25 weight percent, of the formulation. Higher functional acrylate materials, e.g., tetraacrylates, pentaacrylates and mixtures of tetraacrylates and pentaacrylates, can also be used in the formulation, such as in amounts of from 3 to 15 weight percent, particularly 5 to 10 weight percent, e.g., in amounts of approximately 5 weight percent.

Monoacrylate materials can comprise from 0 or 10 to 75 or 100 weight percent of the formulation, desirably from 25 to 85 weight percent, more desirably from 35 to 75, e.g., from 40 to 70 weight percent, of the formulation. In particular, when the monoacrylate is a hydroxy-functional acrylate, it can comprise from 5 to 75, e.g., from 35 or 40 to 60, weight percent of the formulation. If alkoxysilyl acrylates are used in the formulation, from 5 to 15 weight percent of such materials can be used.

The aforedescribed percentages of the functional acrylate monomers are based on the total quantity of polymerizable monomeric materials comprising the curable AB film formulation, not including other components, such as non-polymerizable organic diluents, e.g., solvents, photoinitiators, stabilizers, plasticizers and other such components. The total of all of the various polymerizable monomeric materials comprising the curable AB film formulation will, of course, equal 100 percent. The percentage of each of the functional acrylate monomers described heretofore can vary between any combination of the stated values, inclusive of the stated values.

In a further contemplated embodiment of the present invention, the acrylate-based film is prepared from a composition comprising a mixture of free-radical initiated acrylate monomer(s) and cationic initiated epoxy monomer(s). The curable composition can comprise from 10 to 85 percent by weight of at least one epoxy monomer(s) and from 90 to 15 percent by weight of at least one acrylate monomer(s), more typically, from 30 to 70 weight percent epoxy monomer(s) and from 70 to 30 weight percent acrylate monomer(s), and preferably from 35 to 50 weight percent epoxy monomer(s) and from 65 to 50 weight percent acrylate monomers. Monomers containing both epoxy and acrylic functionality are categorized herein as acrylate monomers. The range of acrylate monomers and epoxy monomers in the curable composition described heretofore can vary between any combination of the stated values, inclusive of the stated values.

Epoxy monomers used in the AB film formulation are those monomers that are initiated by cationic initiators. The preferred epoxy monomers are epoxy condensation polymers, such as polyglycidyl ethers of alcohols and phenols, and certain polyepoxy monomers and oligomers. The epoxy monomers improve adhesion of the cured AB film to the photochromic coating and enhance other properties of the cured AB film, such as improving the adhesion of an abrasion-resistant coating, e.g., a siloxane coating, to the cured AB film. Cured AB films prepared with epoxy monomers also appear to improve the abrasion resistance of the abrasion-resistant coating (hard coat), when used, that is applied to the photochromic coating and results also in less crazing of an antireflective coating (when used over the hard coat).

In the following detailed examples of identified acrylate monomer materials, the term "acrylate" is intended to mean and include the corresponding alkyl acrylates containing from 1 to 4 carbon atoms in the alkyl group, particularly the corresponding methacrylate; and where the alkyl acrylate, e.g., methacrylate, is identified, the corresponding acrylate is contemplated. For example, reference to hydroxyethyl acrylate in the examples includes hydroxyethyl methacrylate, hydroxyethyl ethacrylate, etc.; and reference to ethylene glycol diacrylate includes, for example, ethylene glycol dimethacrylate, ethylene glycol diethacrylate, etc. Non-limiting examples of such monomer materials include:

Hydroxyethyl acrylate,
Hydroxypropyl acrylate,
Hydroxybutyl acrylate,
Hydroxy-poly(alkyleneoxy)alkyl acrylate,
Caprolactone acrylate, Ethylene glycol diacrylate,
Butanediol diacrylate,
Hexanediol diacrylate,
Hexamethylene diacrylate,
Diethylene glycol diacrylate,
Triethylene glycol diacrylate,
Tetraethylene glycol diacrylate,
Polyethylene glycol diacrylate,
Dipropylene gycol diacrylate,
Tripropylene glycol diacrylate,
Tetrapropylene glycol diacrylate,
Polypropylene glycol diacrylate,
Glyceryl ethoxylate diacrylate,
Glyceryl propoxylate diacrylate,
Trimethylolpropane triacrylate
Trimethylolpropane ethoxylate triacrylate,
Trimethylolpropane propoxylate triacrylate,
Neopentyl glycol diacrylate,
Neopentyl glycol ethoxylate diacrylate,
Neopentyl glycol propoxylate diacrylate,
Monomethoxy trimethylolpropane ethoxylate diacrylate,
Pentaerythritol ethoxylate tetraacrylate,
Pentaerythritol propoxylate tetraacrylate,
Dipentaerythritol pentaacrylate,
Dipentaerythritol ethoxylate pentaacrylate,
Dipentaerythritol propoxylate pentaacrylate,
Di-trimethylolpropane ethoxylate tetraacrylate,
Bisphenol A ethoxylate diacrylate containing from 2 to 20 ethoxy groups,
Bisphenol A propoxylate diacrylate containing from 2 to 20 propoxy groups,
Bisphenol A alkoxylated diacrylate containing a mixture of from 2 to 20 ethoxy and propoxy groups,
Bisphenol A glycerolate dimethacrylate,
Bisphenol A glycerolate (1 glycerol/1 phenol) dimethacrylate,
Glycidyl acrylate,
β-methylglycidyl acrylate,
Bisphenol A-monoglycidyl ether acrylate,
4-glycidyloxybutyl methacrylate,
3-(glycidyl-2-oxyethoxy)-2-hydroxypropyl methacrylate,
3-(glycidyloxy-1-isopropyloxy)-2-hydroxypropyl acrylate,
3-(glycidyloxy-2-hydroxypropyloxy)-2-hydroxypropyl acrylate, and
3-(Trimethoxysilyl)propyl methacrylate.

Epoxy monomers, e.g., monomers having at least one epoxy group in the molecule can be represented by the following general formula VIII,

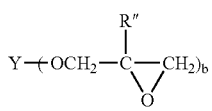

VIII wherein Y is a residue of a b-valent alcoholic hydroxyl compound, a residue of a b-valent phenolic hydroxyl group-containing compound, or a residue of a b-valent carboxylic acid, R″ is a hydrogen atom or a methyl group, and b is an integer of from 1 to 4, usually 1 to 2. These materials include alcoholic hydroxyl group-containing compounds of monohydric dihydric or trihydric alcohols, reaction products between phenolic hydroxyl compounds, such as phenol and hydroquinone, and epichlorohydrin, and reaction products between carboxylic acids, such as benzoic acid and terephthalic acid, and epichlorohydrin.

The epoxy monomer represented by formula VIII can also contain (as part of Y) a radical polymerizable group (other than acrylic) such as a vinyl group or an allyl group. Monomers containing an acrylic polymerizable group and an epoxy group are categorized herein with the acrylate monomer(s) previously described.

Non-limiting examples of epoxy monomer compounds having at least one epoxy group in the molecule and not having a polymerizable group include those of formula VIII wherein b is 1 or 2. When b is 1, Y can be an alkyl group having from 2 to 20 carbon atoms, which can be substituted with a hydroxyl group; a cycloalkyl group having from 6 to 7 carbon atoms, which can be substituted with a hydroxyl group; a phenyl group, which can be substituted with a hydroxyl group; a benzoyl group, which can be substituted with a carboxyl group or a hydroxyalkyleneoxy group. When b is 2, Y can be an alkylene group containing from 2 to 20 carbon atoms, which can be substituted with a hydroxyl group; a cycloalkylene group, which can be substituted with a hydroxyl group; a phenylene group, which can be substituted with a hydroxyl group; a phthaloyl group; an isophthaloyl group; a terephthaloyl group; a 2,2'-bisphenylene propyl group; and an alkyleneoxy group. The alkyleneoxy group can have from 1 to 20 alkyleneoxy groups, and the alkylene moiety can have from 2 to 4 carbon atoms.

Non-limiting examples of epoxy compounds include ethylene glycol glycidyl ether, propylene glycol glycidyl ether, 1,4-butanediol diglycidyl ether, glycerol polyglycidyl ether, diglycerol polyglycidyl ether, sorbitol polyglycidyl ether, butyl glycidyl ether, phenyl glycidyl ether, polyethylene glycol diglycidyl ether, polypropylene glycol diglycidyl ether, neopentyl glycol diglycidyl ether, 1,6-hexanediol diglycidyl ether, propylene carbonate, bisphenol A or hydrogenated bisphenol A propylene oxide adduct, diglycidyl ester of terephthalic acid, spiroglycol diglycidyl ether, hydroquinone diglycidyl ether and 3,4-epoxycyclohexane carboxylate.

Epoxy condensation polymers that can be used are polyepoxides having a 1,2-epoxy equivalency greater than 1, e.g., up to 3. Non-limiting examples of such materials are polyglycidyl ethers of polyhydric phenols and aliphatic (cyclic and alicyclic) alcohols. These polyepoxides can be produced by etherification of the polyhydric phenol or aliphatic alcohol with an epihalohydrin, such as epichlorohydrin, in the presence of an alkali, such as sodium hydroxide. Non-limiting examples of suitable polyphenols are 2,2-bis(4-hydroxyphenyl)propane, i.e., bisphenol A, 1,1-bis(4-hydroxyphenyl)ethane, and 2-methyl-1,1-bis(4-hydroxyphenyl)propane. Non-limiting examples of aliphatic alcohols include ethylene glycol, diethylene glycol, 1,2-propylene glycol, 1,4-butylene glycol, 1,2-cyclohexanediol, 1,4-cyclohexanediol, 1,2-bis(hydroxymethyl)cyclohexane and hydrogenated bisphenol A. These epoxy materials are available from Resolution Performance Products under the EPON trade name.

Examples of polyepoxide monomers and oligomers are described in U.S. Pat. No. 4,102,942 (column 3, lines 1-16). Non-limiting examples of such polyepoxides are 3,4-epoxycyclohexylmethyl, 3,4-epoxycyclohexanecarboxylate and bis(3,4-epoxycyclohexylmethyl)adipate. Aliphatic polyepoxides are available from the Dow Corporation under the CYRACURE trade name.

Monomeric materials that comprise the curable AB film formulation are commercially available; and, if not commercially available, can be prepared by procedures well known to those skilled in the art. Examples of commercial acrylate materials can be found in U.S. Pat. No. 5,910,375, particularly in the disclosure found in column 8, lines 20-55, and in column 10, lines 5-36. Commercially available acrylate materials are available from various manufacturers and include those sold under the tradenames, SARTOMER, EBECRYL, and PHOTOMER.

The curable AB film formulation will also contain at least one free radical photoinitiator when cured by UV radiation. When the formulation includes cationic initiated epoxy monomer(s), the formulation will also contain at least one cationic photoinitiator. Desirably, a combination of photoinitiators is used. A photoinitiator is not required when the resin formulation is to be cured by an electron beam process. The photoinitiator will be present in amounts sufficient to initiate and sustain the curing of the formulation, i.e., an initiating amount. Photoinitiators are desirably used in the least amount necessary to obtain initiation of the curing process. Generally, the photoinitiator(s) will be present in amounts of from 0.1 to 10 weight percent, such as from 0.5 to 6 weight percent, more generally from 1 to 4 weight percent, based on the total weight of the photoinitiated polymerizable components in the curable AB film formulation. Free radical photoinitiators are discussed and described above in connection with the photochromic polymer coating. That discussion is applicable here also in connection with the curable AB film and is hereby incorporated here. Further examples of commercial photoinitiators can be found in column 10, lines 38-43 of U.S. Pat. No. 5,910,375.

Cationic photoinitiators can be used in conjunction with the free-radical photoinitiators. Typically, cationic photoinitiators are used with abstraction type photoinitiators, hydrogen donor materials such as butyryl choline triphenylbutyl borate or combinations of such materials. Onium salts, which are described in U.S. Pat. No. 5,639,802, column 8, line 59 to column 10, line 46, can be used as cationic photoinitiators. Non-limiting examples of such initiators include 4,4'-dimethyldiphenyliodonium tetrafluoroborate, phenyl-4-octyloxyphenyl phenyliodonium hexafluoroantimonate, dodecyldiphenyl iodonium hexafluoroantimonate, [4-[(2-tetradecanol)oxy]phenyl]phenyl iodonium hexafluoroantimonate, triaryl sulfonium hexafluoroantimonate salts and triaryl sulfonium hexafluorophosphate salts, e.g., triphenylsulfonium salt of phosphorous hexafluoride. Mixtures of cationic photoinitiators can also be used.

In addition to the above-described components, the AB film formulation can include other additives known to those skilled in the art. These additives can include, but are not limited to, flow and leveling additives, wetting agents, antifoaming agents, LW absorbers, rheology modifiers, surfactants, e.g., fluorosurfactants, stabilizers and antioxidants. Such materials are well known to those skilled in the art, and non-limiting examples of some commercial surfactants and antioxidants/stabilizers can be found in column 10, lines 43-54 of the aforementioned '375 patent. Other examples of such additives include silicones, modified silicones, silicone acrylates, hydrocarbons, and other fluorine-containing compounds.

The AB film formulation can also contain ultraviolet light stabilizers, which may be a UV absorber and/or a hindered amine light stabilizer (HALS). Non-limiting examples of LW absorbers include the benzotriazols and hydroxybenzophenones. Care should be observed, however, in the case of UV absorbers that sufficient UV radiation of the appropriate wavelength is permitted to pass through the AB film to activate the photochromic material(s) within the photochromic polymeric coating. HALS stabilizers are available from Ciba-Geigy under the TINUVIN trade name. The amount of light stabilizer that is used is that amount that is effective to stabilize the composition, i.e., an effective amount, which will depend on the specific compounds chosen, but typically is up to 20 parts by weight relative to 100 parts by weight of the polymerizable resin components. The UV absorber is also used in effective amounts, which is typically up to 10 parts by weight, e.g., 0.05 to 5 parts by weight, relative to 100 parts of the polymerizable resin components.

The curable AB film formulation is prepared by mixing the components of the formulation at room temperature, although mild heating can be used to facilitate mixing and blending. The formulation can be applied to the photochromic coating by the same procedures that have been described for applying the photochromic coating to the plastic substrate, e.g., spin coating and dip coating. In a contemplated embodiment, the photochromic coating is first treated to enhance adhesion of the AB film, e.g., by treatment with a plasma discharge. Surface treatments with plasma are discussed above and that discussion is also applicable here. One contemplated plasma treatment involves use of a plasma generated by a Plasmatech machine operating at a power level of 750 Watts for from 1 to 10, e.g., 2 to 5 minutes, while introducing 400 ml/minute of oxygen into the vacuum chamber of the Plasmatech machine.

The curable AB film is applied in a manner to obtain a substantially homogeneous cured film, the thickness of which can vary. In one contemplated embodiment, the thickness is less than 100 microns, e.g., not more than 50 microns. In another contemplated embodiment, the film thickness can vary from 2 to 20 microns, e.g., 2 to 15 microns, more typically from 8 to 12 microns, e.g., from 10 to 12 microns. The film thickness can range between any combinations of these values, inclusive of the recited values. It is contemplated that more than one AB film can be used as the tie layer, and that such multiple films can be of different compositions and hardness values. The term "film" is generally considered by those skilled in the coating art to be a layer with a thickness of not more than 20 mils (500 microns); however, as used in this disclosure and claims, the term film when used in relation to the radiation-cured, acrylate-based film is defined as having a thickness, as herein described.

The applied film is then exposed to UV radiation (or to the EB process, if UV radiation is not used.) Any appropriate type of UV lamp, e.g., mercury vapor or pulsed xenon, can be used. The absorbance spectra of the photoinitiator(s) should be matched with the spectral output of the UV lamp (bulb), e.g., an H bulb, D bulb, Q bulb or V bulb, for the highest curing efficiency. The cure process is generally more efficient when oxygen, e.g., air, is excluded from the cure process. This can be accomplished by using a nitrogen blanket over the applied film during the cure process.

Following the UV cure, a thermal post cure can be used to cure completely the AB film. Heating in an oven at 212° F. (100° C.) for from 0.5 to 3 hours is usually adequate to thoroughly cure the AB film. The previous discussion respecting radiation curing of the photochromic coating is also applicable here in connection with the cure of the AB film.

In a further contemplated embodiment, an abrasion-resistant coating is superposed, e.g., superimposed on, the AB film. In such an embodiment, the post thermal cure of the AB film can be postponed until after application of the abrasion-resistant coating if there is no significant physical handling of the AB film coated product until after application of the abrasion-resistant coating. If such handling is required, it is suggested that the thermal post cure of the AB film be performed prior to application of the abrasion-resistant coating.

The cured AB film should be transparent, more particularly., optically clear when used for optical, e.g., ophthalmic, applications, and not significantly impair the optical properties of the photochromic coated substrate. The terms "transparent" and "optically clear" are defined earlier in this disclosure. The surface of the cured AB film(s) is desirably harder than the photochromic coating to which it is applied, and is usually softer than the abrasion-resistant coating that is commonly applied to the AB film. As described, the cured AB film should be scratch resistant, adhere well to the photochromic coating, be resistant to treatment with aqueous inorganic caustic solutions, and be compatible with abrasion resistant coatings that are prepared with organo-silane(s).

The scratch resistance of the acrylate-based film can be measured by a conventional steel wool scratch test. This test measures the average haze gain of a surface subjected to abrasion by very fine steel wool. In accordance with an embodiment of the present invention, the average haze gain should be less than 40, desirably less than 30, and more desirably less than 20. An Eberbach Steel Wool Abrasion Tester can be used to determine surface scratch resistance.

In performing the steel wool scratch test, 000 steel wool, e.g., Rhodes extra fine steel wool, is mounted over the end of a one-inch (2.54 cm) by one-inch (2.54 cm) mandrel. The sample to be tested, e.g., a lens, is cleaned with mild warm soapy water, rinsed with water, and then air-dried. The lens is then conditioned for at least 2 hours at 23+/−3° C. and 50% +/−10% relative humidity. The light transmission of the sample at 550 nm is measured using a Haze Gard Plus instrument, which is manufactured by BYK-Gardner. The conditioned sample is mounted onto the Eberbach testing platform. If a lens is to be tested, it is centered on the testing platform with the concave side down. The mandrel is weighted with 5 pounds (2.3 kg) of weight and lowered onto the sample. The sample is cycled back and forth under and in contact with the steel wool at a rate of 100 times per minute for two minutes so that the sample passes under the steel wool 200 times. The sample is cleaned again with mild warm soapy water, rinsed with water and dried. The light transmission of the sample at 550 nm is re-measured. The difference between the light transmission values before and after testing, i.e., the delta ($\Delta$) in light transmission, is the haze gain.

A Bayer Abrasion Tester can also be used to determine surface abrasion resistance. In this test, the resistance of a product to abrasion is quantified by measuring the haze of the test sample after abrasion and comparing that value to that measured on a control sample, e.g., a plano lens prepared from diethylene glycol bis(allyl carbonate) in the case of an ophthalmic product. Usually, measurements are made on multiple pairs of test sample/controls, e.g., 5 pairs. The samples and controls to be tested are cleaned with mild soapy water, rinsed with water and then dried with air. The test samples and controls are conditioned for a minimum of 2 hours, while the abrasive material is conditioned for a minimum of 24 hours, in a temperature and humidity controlled environment (23+/−3° C. and 50+/−10% relative humidity). The light transmission of the test sample and control at 550 nm is measured using a Haze-Gard Plus device. The test sample and control are mounted on the Bayer Abrader and the abrasion medium, e.g., alumina (Norton ZF E-327 grit #12), placed in the pan of the Abrader. When lenses are tested, they are mounted convex side down. The Abrader is operated for 4 minutes at a rate of 150 cycles per minute for a total of 600 cycles. Both the test samples and controls are cleaned with mild soapy water, rinsed and dried with air. The haze of the test samples and controls are again measured at 550 nm using the Haze Gard Plus device. The haze gain is calculated from the difference in light transmission values before and after abrading. The Bayer Haze Gain Ratio is determined by dividing the measured haze of the control by that of the test sample (Haze Gain Ratio=Haze (control)/Haze (test sample). Desirably, the Bayer haze gain ratio for the radiation cured AB film is greater than 0.6, more desirably greater than 0.7.

The radiation cured AB film desirably should also adhere firmly to the photochromic coating applied to the plastic substrate. Adhesion can be determined by the conventional art recognized crosshatch tape peel adhesion test, and by a boiling water crosshatch tape peel adhesion test, which is a more stringent test. The former is often referred to as the primary (1°) test or dry test; while the later is often referred to as the secondary (2°) or wet test. In the primary test, a cutting tool composed of eleven blades spaced approximately 1 mm apart (tip to tip) and 0.65 mm thick is used to make a first long cut on the sample followed by second and third cuts, which are made at 90 degrees to and across the first cut. The second and third cuts are separated from each other to provide separate crosshatch zones. A piece of Scotch 3M masking tape one inch (2.54 cm) wide and 2 to 2½ inches long (5 to 6.3 cm) is applied in the direction of the first cut and pressed down to smooth out any bubbles. The tape is then peeled off the surface with a sharp, rapid, even and continuous movement. The procedure is repeated with a fresh piece of tape. A small piece of tape (1-½ inches, 3.8 cm) is applied to each of the crosshatch zones produced by the second and third cuts in a direction 90 degrees to the direction of the first tape, and these pieces of tape also peeled off the surface with a sharp, rapid, even and continuous movement. If 30 percent or less of the squares of the grid produced by the cutting tool are found to have debonded from the substrate (photochromic coating), e.g., at least 70 percent of the grids remain intact, the coating is deemed to pass the adhesion test. More particularly, it is desirable that no more than 20, particularly no more than 10, squares, still more particularly, no more than 5 squares, e.g., 1 square, out of a 100 squares of the grid debond from the substrate. In accordance with the present invention, the radiation-cured AB film should pass the crosshatch tape peel adhesion test to be considered to have adhered to the photochromic coating. Stated differently, if the radiation-cured AB film passes the crosshatch tape peel test, it is referred to herein as being coherently appended (or cohesively appended) or attached to the layer, e.g., the photochromic coating, to which it is appended.

A further more severe adhesion test, i.e., the secondary or wet adhesion test, optionally can be performed to assess the adhesion of the radiation-cured AB film to the photochromic coating. This further test, i.e., the boiling water cross-hatch adhesion test, involves placing the test sample, e.g., lens, which has been scored with cross hatches, as described above, in boiling deionized water for 30 minutes. After the test sample has cooled to room temperature, the crosshatch tape peel adhesion test, as described above, is performed again. The same pass/fail requirements that were described for the crosshatch adhesion test are used for this boiling water modification of the test.

The radiation-cured AB film should also be resistant to removal by aqueous inorganic caustic solutions, e.g., relatively dilute alkali metal hydroxide solutions, such as solutions of sodium hydroxide or potassium hydroxide. The film is considered to be resistant to removal by such solutions if the thickness of the film is reduced not more than 0.5 micron after exposure to 12.5% aqueous potassium hydroxide at 140° F. (60° C.) for four minutes. Desirably, the film thickness is not reduced more than 0.5 microns after two exposures, more desirably after three exposures, to the aqueous potassium hydroxide solution.

Additionally, it is desired, but not imperative, that the radiation-cured AB film serves to protect the photochromic coating by substantially inhibiting the migration of photochromic material from the photochromic coating into the superimposed AB film, and further by serving as a barrier film for the photochromic coating. Photochromic migration can be evaluated by comparing the saturated optical density (OD) and the bleach half-life (T½), of photochromic articles of the present invention, i.e., an article with a radiation-cured, adhesion promoter-containing AB film, that has been heated in a 100° C. oven for 3 hours with a similar photochromic article (a control) that does not have the described AB film. If photochromic migration occurs, it will be observed by a decrease in the saturated optical density and/or an increase in the bleach half-life. Consideration of both the bleached half-life and saturated optical density delta values is required to determine if photochromic migration has occurred because the AB film might serve as a filter of incident light falling on the AB film and passing through to the photochromic coating. Desirably, the increase in bleach half-life and the decrease in saturated optical density does not change more than 20%, more desirably not more than 16%, still more desirably less than 10%, e.g., less than 5%, of the control values.

The saturated optical density and bleach half-life of a photochromic article can be measured using a conventional optical bench, which apparatus is well known to those skilled in the art. Test samples are exposed to UV irradiation on the optical bench using commonly a Xenon arc lamp. The change in optical density ($\Delta$ OD) from the bleached state to the darkened state is determined by establishing the initial transmittance of the sample (bleached state), exposing the samples to the Xenon arc lamp to provide UV radiation and thus activate the photochromic material(s) to produce the darkened state. Exposure to the Xenon arc lamp is for a time sufficient to allow the photochromic material to reach a saturated state of equilibrium. The change in optical density is calculated according to the formula: $\Delta$ OD=log (% Tb/% Ta), wherein %Tb is the percent transmittance in the bleached state, % Ta is the percent transmittance in the activated (darkened) state, and the logarithm is to the base 10. The bleach rate (T½) is the time interval in seconds for the $\Delta$ OD of the activated form of the photochromic material(s) in the article to reach one-half of the highest $\Delta$ OD after removal of the source of activating radiation, i.e., the Xenon arc lamp.

The radiation-cured AB film is also compatible with abrasion-resistant coatings (hard coat), particularly abrasion-resistant coatings comprising organo silane material(s), that are used to protect plastic surfaces from abrasion, scratches, etc. Organo silane-containing abrasion-resistant coatings, often referred to as hard coats or silane-based hard coatings, are well known in the art, and are commercially available from various manufacturers, such as SDC Coatings, Inc. and PPG Industries, Inc. Such coatings are used as a measure of the compatibility of the AB film to the abrasion-resistant coating. Reference is made to U.S. Pat. No. 4,756,973 at column 5, lines 1-45; and U.S. Pat. No. 5,462,806 at column 1, lines 58 through column 2, line 8, and column 3, line 52 through column 5, line 50, which disclosures describe organo silane hard coatings. Reference is also made to U.S. Pat. Nos. 4,731,264, 5,134,191, 5,231,156 and International Patent Publication WO 94/20581 for disclosures of organo silane hard coatings.

While a described physical feature of the radiation-cured AB film is that it be compatible with organo silane hard coatings, other coatings that provide abrasion and scratch resistance, such as polyfunctional acrylic hard coatings, melamine-based hard coatings, urethane-based hard coatings, alkyd-based coatings, silica sol-based hard coatings or other organic or inorganic/organic hybrid hard coatings can be used as the abrasion-resistant coating. One skilled in the art can readily determine if the AB film is compatible with organo silane hard coats by applying an organo silane hard coat to the AB film and determining the compatibility of the AB film to that hard coat by means of the cross-hatch tape peel adhesion test, which is performed on the hard coat. Another method of determining compatibility of the AB film to the hard coat is the absence of crazing in the hard coat after it has been applied to the AB film and cured. By crazing is meant the presence of fractures in the hard coat. Such fractures are sometimes readily apparent by observation; however, the fractures can be very fine and observable by magnification under bright light. The source of the bright light can be a high intensity white arc light of a 75 watt xenon bulb, with the light being projected vertically down through the hard coat.

By use of the term "compatible with an organo silane abrasion resistant coating (hard coat)" is meant that the AB film is capable of having an organo silane hard coat deposited on its surface and that the organo silane hard coat adheres to the AB film under ordinary handling/wear conditions, as determined by the crosshatch tape peel adhesion test or the absence of crazing in the hard coat. Naturally, the organo silane hard coat can be removed by treatment with concentrated aqueous caustic, or severe mechanical abrasion. Further, the term abrasion-resistant organo silane-containing coating (or other such similar meaning terms) is meant that the abrasion-resistant coating is prepared from a composition comprising at least one organo silane.

It is contemplated that, if required, a primer coating is applied to the AB film before applying the abrasion-resistant coating on top of the AB film. Such primer coatings are known in the art. Selection of an appropriate primer coating will depend on the AB film and abrasion-resistant coating used, i.e., the primer coating must be chemically and physically compatible (non-reactive) with the surfaces that it abuts. The primer coating can be one or several monomolecular layers thick, and can range from 0.1 to 10 microns, e.g., from 0.1 to 2 or 3 microns, in thickness. Such primer coatings are discussed herein in relation to the photochromic coating, and that discussion is applicable here also.

In one embodiment, the hard coat can be prepared from a composition comprising from 35 to 95 weight percent, as calculated solids, of at least one organo silane monomer represented by the following empirical formula IX:

$$R^1SiW_3 \qquad \qquad IX$$

wherein $R^1$ can be glycidoxy($C_1$-$C_{20}$)alkyl, desirably glycidoxy($C_1$-$C_{10}$)alkyl, and more desirably, glycidoxy ($C_1$-$C_4$) alkyl; W can be hydrogen, halogen, hydroxy, $C_1$-$C_5$ alkoxy, $C_1$-$C_5$ alkoxy($C_1$-$C_5$)alkoxy, $C_1$-$C_4$ acyloxy, phenoxy, $C_1$-$C_3$ alkylphenoxy, or $C_1$-$C_3$ alkoxyphenoxy, said halogen being bromo, chloro or fluoro. Typicably, W is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halogen is chloro or fluoro. More typically, W is hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy.

The weight percent, as calculated solids, of silane monomer(s) represented by empirical formula IX in the hard coat composition is typically from 40 to 90, more typically from 45 to 85, and still more typically from 50 to 70 weight percent. The weight percent calculated solids are determined as the percent of the silanol that theoretically forms during hydrolysis of the orthosilicate.

Non-limiting examples of silane monomers represented by general formula IX include:
glycidoxymethyltriethoxysilane,
glycidoxymethyltrimethoxysilane,
alpha-glycidoxyethyltrimethoxysilane,
alpha-glycidoxyethyltriethoxysilane,
alpha-glycidoxypropyltrimethoxysilane,
alpha-glycidoxypropyltriethoxysilane,
alpha-glycidoxypropyltrimethoxysilane,
alpha-glycidoxypropyltriethoxysilane,
beta-glycidoxyethyltrimethoxysilane,
beta-glycidoxyethyltriethoxysilane,
beta-glycidoxypropyltrimethoxysilane,
beta-glycidoxypropyltriethoxysilane,
beta-glycidoxybutyltrimethoxysilane,
beta-glycidoxybutyltriethoxysilane,
gamma-glycidoxypropyltrimethoxysilane,
gamma-glycidoxypropyltriethoxysilane,
gamma-glycidoxypropyltripropoxysilane,
gamma-glycidoxypropyltributoxysilane,
gamma-glycidoxypropyltrimethoxysilane,
gamma-glycidoxypropyltriphenoxysilane,
gamma-glycidoxybutyltrimethoxysilane,
gamma-glycidoxybutyltriethoxysilane,
delta-glycidoxybutyltrimethoxysilane,
delta-glycidoxybutyltriethoxysilane, hydrolyzates of such silane monomers, and mixtures of such silane monomers and hydrolyzates thereof.

The hard coat composition of the foregoing described embodiments can further include from 5 to 65 weight percent, as calculated solids, of: (a) silane monomers represented by empirical formula X; (b) metal alkoxides represented by empirical formula XI; or (c) a mixture thereof in a weight ratio of (a):(b) of from 1:100 to 100:1. Typically, the hard coat composition includes from 10 to 60 weight percent calculated solids, more typically from 15 to 55, and still more typically from 30 to 50 weight percent calculated solids of the aforementioned materials (a), (b) or (c).

The hard coat composition can include at least one silane monomer represented by the following empirical formula X:

$$R^2{}_b(R^3)_c SiZ_{4-(b+c)} \qquad X$$

wherein $R^2$ can be $C_1$-$C_{20}$ alkyl, $C_1$-$C_{20}$ haloalkyl, $C_2$-$C_{20}$ alkenyl, $C_2$-$C_{20}$ haloalkenyl, phenyl, phenyl($C_1$-$C_{20}$)alkyl, $C_1$-$C_{20}$ alkylphenyl, phenyl($C_2$-$C_{20}$)alkenyl, $C_2$-$C_{20}$ alkenylphenyl, morpholino, amino($C_1$-$C_{20}$)alkyl, amino($C_2$-$C_{20}$)alkenyl, mercapto($C_1$-$C_{20}$)alkyl, mercapto($C_2$-$C_{20}$)alkenyl, cyano($C_1$-$C_{20}$)alkyl, cyano($C_2$-$C_{20}$)alkenyl, acryloxy, methacryloxy, or halogen. The halo or halogen can be bromo, chloro, or fluoro. Typically, $R^2$ is a $C_1$-$C_{10}$ alkyl, $C_1$-$C_{10}$ haloalkyl, $C_2$-$C_{10}$ alkenyl, phenyl, phenyl($C_1$-$C_{10}$)alkyl, $C_1$-$C_{10}$ alkylphenyl, morpholino, amino($C_1$-$C_{10}$) alkyl, amino ($C_2$-$C_{10}$) alkenyl, mercapto($C_1$-$C_{10}$)alkyl, mercapto($C_2$-$C_{10}$) alkenyl, cyano($C_2$-$C_{10}$)alkenyl, or halogen and the halo or halogen is chloro or fluoro.

In formula X, $R^3$ can be $C_1$-$C_{20}$ alkylene, $C_2$-$C_{20}$ alkenylene, phenylene, $C_1$-$C_{20}$ alkylenephenylene, amino($C_1$-$C_{20}$)alkylene, or amino($C_2$-$C_{20}$)alkenylene; Z can be hydrogen, halogen, hydroxy, $C_1$-$C_5$ alkoxy, $C_1$-$C_5$ alkoxy($C_1$-$C_5$) alkoxy, $C_1$-$C_4$ acyloxy, phenoxy, $C_1$-$C_3$ alkylphenoxy, or $C_1$-$C_3$ alkoxyphenoxy, said halo or halogen being bromo, chloro or fluoro; b and c are each an integer of from 0 to 2; and the sum of b and c is an integer of from 0 to 3. Typically, $R^3$ is $C_1$-$C_{10}$ alkylene, $C_2$-$C_{10}$ alkenylene, phenylene, $C_1$-$C_{10}$ alkylenephenylene, amino($C_1$-$C_{10}$)alkylene, or amino($C_2$-$C_{10}$)alkenylene, Z is hydrogen, halogen, hydroxy, $C_1$-$C_3$ alkoxy, $C_1$-$C_3$ alkoxy($C_1$-$C_3$)alkoxy, $C_1$-$C_2$ acyloxy, phenoxy, $C_1$-$C_2$ alkylphenoxy, or $C_1$-$C_2$ alkoxyphenoxy, and the halo or halogen is chloro or fluoro.

Non-limiting examples of silane monomers represented by general formula X include methyltrimethoxysilane, methyltriethoxysilane, methyltrimethoxyethoxysilane, methyltriacetoxysilane, methyltripropoxysilane, methyltributoxysilane, ethyltrimethoxysilane, ethyltriethoxysilane, and gamma-methacryloxypropyltrimethoxysilane, gamma-aminopropyltrimethoxysilane, gamma-aminopropyltriethoxysilane, gamma-mercaptopropyltrimethoxysilane, chloromethyltrimethoxysilane, chloromethyltriethoxysilane, dimethyldiethoxysilane, gamma-chloropropylmethyldimethoxysilane, gamma-chloropropyl-methyldiethoxysilane, tetramethylorthosilicate, tetraethylorthosilicate, hydrolyzates of such silane monomers, and mixtures of such silane monomers and hydrolyzates thereof.

The hard coat composition can include at least one compound represented by empirical formula XI:

$$M(T)_q \qquad XI$$

wherein M is a metal chosen from aluminum, antimony, tantalum, titanium and zirconium; T is $C_1$-$C_{10}$ alkoxy and q is an integer equivalent to the valence of M. Usually, M is chosen from aluminum, titanium or zirconium and T is $C_1$-$C_5$ alkoxy, e.g., propoxy.

The hard coat composition can also include from 0 to 20 weight percent, based on the total weight of the composition, of a metal oxide chosen from silicon dioxide (silica), aluminum oxide (alumina), antimony oxide, tin oxide, titanium oxide, zirconium oxide or mixtures of such metal oxides. The metal oxide can be in the form of a sol. As used in the present specification, the term sol means and includes a colloidal dispersion of finely divided solid inorganic metal oxide particles in an aqueous or an organic liquid. The average size of such particles can range from 1 to 200 nanometers, preferably from 2 to 100 nanometers, and more preferably, from 5 to 50 nanometers.

Such metal oxide sols can be prepared by hydrolyzing a metal salt precursor for a time sufficient to form the desired particle size or such sols can be purchased commercially. Examples of commercially available metal oxide sols that can be used in the hard coat composition include NALCO® colloidal sols (available from NALCO Chemical Co.), REMASOL® colloidal sols (available from Remet Corp.) and LUDOX® colloidal sols (available from E.I. du Pont de Nemours Co., Inc.). Stable acidic and alkaline metal oxide sols are commercially available as aqueous dispersions. Usually, the metal oxide is silica or alumina supplied in the form of an acid stabilized colloidal silica, acid stabilized colloidal alumina, e.g., NALCO® 8676, or an acid stabilized alumina coated silica sol, e.g., NALCO® 1056. Metal oxide sols can also be obtained as dispersions in organic liquids, e.g., ethanol, isopropyl alcohol, ethylene glycol and 2 propoxyethanol.

The hard coat composition also contains a catalytic amount of a water-soluble acid catalyst. A catalytic amount is that amount which is sufficient to cause polycondensation of the silane monomer(s). Typically, the catalytic amount of acid catalyst will range from 0.01 to 10 weight percent, based on the total weight of the hard coat composition. The water-soluble acid catalyst can be an organic carboxylic acid or an inorganic acid. Non-limiting examples of suitable catalysts include acetic acid, formic acid, glutaric acid, maleic acid, nitric acid, sulfuric acid and hydrochloric acid.

Organic solvents present in the hard coat composition can be added or formed in situ by the hydrolysis of the silane monomer(s). Organic solvents used are those that will dissolve or disperse the solid components of the coating composition. The minimum amount of solvent present in the coating composition is a solvating amount, i.e., an amount that is sufficient to solubilize or disperse the solid components in the coating composition. For example, the amount of solvent present can range from 20 to 90 weight percent based on the total weight of the coating composition and depends, in part, on the amount of silane monomer present in the coating composition. Such solvents include, but are not limited to, the following: benzene, toluene, methyl ethyl ketone, methyl isobutyl ketone, acetone, ethanol, tetrahydrofurfuryl alcohol, propyl alcohol, propylene carbonate, N-methylpyrrolidinone, N-vinylpyrrolidinone, N-acetylpyrrolidinone, N-hydroxymethylpyrrolidinone, N-butyl-pyrrolidinone, N-ethylpyrrolidinone, N-(N-octyl)-pyrrolidinone, N-(n-dodecyl) pyrrolidinone, 2-methoxyethyl ether, xylene, cyclohexane, 3-methylcyclohexanone, ethyl acetate, butyl acetate, tetrahydrofuran, methanol, amyl propionate, methyl propionate, diethylene glycol monobutyl ether, dimethyl sulfoxide, dimethyl formamide, ethylene glycol, mono- and dialkyl ethers of ethylene glycol and their derivatives, which are sold under the trade name CELLOSOLVE industrial solvents, propylene glycol methyl ether and propylene glycol methyl ether acetate, which are sold under the trade name DOWANOL® PM and PMA solvents, respectively, and mixtures of such solvents.

A leveling amount of nonionic surfactant(s) can be present as a component in the hard coat composition. A leveling amount is that amount which is sufficient to allow the coating to spread evenly or to level the hard coat composition on the surface of the AB film to which it is applied. Typically, the nonionic surfactant is a liquid at the conditions of use and is used in amounts from about 0.05 to about 1.0 weight percent based on the amount of the silane monomer(s). Nonionic surfactants that can be used are described in the *Kirk Othmer Encyclopedia of Chemical Technology*, 3rd Edition, Volume 22, pages 360 to 377. Other potential nonionic surfactants include the surfactants described in U.S. Pat. No. 5,580,819, column 7, line 32 to column 8, line 46.

Non-limiting examples of nonionic surfactants that can be used in the hard coat composition include ethoxylated alkyl phenols, such as the IGEPAL® DM surfactants or octylphenoxypolyethoxyethanol, which is sold as TRITON® X-100, an acetylenic diol such as 2,4,7,9-tetramethyl-5-decyne-4,7-diol, which is sold as SURFYNOL® 104, ethoxylated acetylenic diols, such as the SURFYNOL® 400 surfactant series, fluoro-surfactants, such as the FLUORAD® fluorochemical surfactant series, and capped nonionics, such as the benzyl capped octyl phenol ethoxylates, which is sold as TRITON® CF87, the propylene oxide capped alkyl ethoxylates, which are available as the PLURAFAC® RA series of surfactants, octylphenoxyhexadecylethoxy benzyl ether, polyether modified dimethylpolysiloxane copolymer in solvent, which is sold as BYK®-306 additive by Byk Chemie and mixtures of such recited surfactants.

Water is also present in the hard coat composition in an amount sufficient to form hydrolysates of the silane monomer(s). The water present in the optional metal oxide sol can, in certain circumstances, supply the amount of water necessary. If not, additional water can be added to the coating composition to provide the required additional amount necessary to hydrolyze the silane monomer(s).

The abrasion-resistant coating (hard coat) can be applied to the AB film using the same application techniques described with respect to the photochromic coating and the AB film, e.g., spin coating. The abrasion resistant film can be applied at a thickness of from 0.5 to 10 microns. Prior to applying the hard coat, e.g., the organo silane hard coat, to the AB film, the AB film can be treated to enhance its receptivity of and adhesion of the hard coat. Such treatments, e.g., plasma treatments, as are described above with respect to pretreatment of the photochromic coating prior to application of the AB film can be used.

In a further embodiment of the present invention, additional coatings, such as antireflective coatings, can be applied to the hard coat layer. Examples of antireflective coatings are described in U.S. Pat. No. 6,175,450 and International Patent Publication WO 00/33111.

The present invention is more particularly described in the following examples, which are intended as illustrative only, since numerous modifications and variations therein will be apparent to those skilled in the art. In the examples, percentages are reported as weight percent, unless otherwise specified. Materials, such as monomers, catalysts, initiators, etc., which are identified in one example by a lower case letter in parenthesis and which are used in other examples, are identified in the subsequent examples with the same lower case number.

EXAMPLE 1

In the following example, 74 mm semi-finished polycarbonate lenses obtained from Gentex Optics were used. The test lenses were treated with a corona discharge from a 3DT Multidyne unit operating at 60 Hertz and 1.3 kVA unit for 15 seconds The test lenses were then washed with soapy water, rinsed with deionized water and dried with air. A photochromic polyurethane coating (of the type described in U.S. Pat. No. 6,187,444 B1) was applied to the corona treated lenses and thermally cured. The photochromic polyurethane coatings were approximately 20 microns thick. The coated test lenses were treated by corona discharge from a 3DT Flexidyne unit operating at 20 Hertz and 0.70 kilowatts for 35 seconds and then rinsed with deionized water and dried. An acrylate-based formulation was prepared from the components reported in Table 1 and the formulation applied to the test lenses by spin coating. The coatings were cured in a nitrogen atmosphere with UV light from a D bulb and then post cured for 3 hours at 212° F. (100° C.) in a convection oven. The resulting AB film coatings were approximately 10 microns thick. AB film coated test lenses were transparent and had a light transmission of 84%. AB film coated test lenses were exposed to UV light and observed to reversibly change color.

TABLE 1

| Formulation | |
|---|---|
| Component/ | Weight Percent |
| HEMA (a) | 5.00 |
| SR-247 (b) | 55.14 |
| TMPTMA (c) | 10.38 |
| BEPO (d) | 0.252 |
| Lucirin TPO (e) | 0.252 |
| Desmodur PL 340 (f) | 20.18 |

TABLE 1-continued

Formulation

| Component/ | Weight Percent |
|---|---|
| Ethanol (g) | 2.94 |
| SIM 6500 (h) | 5.86 |

(a) Hydroxyethyl methacrylate (Aldrich)
(b) Neopentyl Glycol Diacrylate (Sartomer)
(d) Bisacrylphosphine oxide (Ciba Geigy)
(e) Diphenyl (2,4,6-trimethylbenzoyl) phosphine oxide (BASF)
(f) Blocked aliphatic polyisocyanates based on IPDI (isophorone diisocyanate) (Bayer Corp)
(g) Ethyl Alcohol (Fisher Scientific)
(h) N-Methylaminopropyl trimethoxysilane (Geleste)

A number of the AB film coated test lenses were treated with a corona discharge from a 3DT Flexidyne unit operating at 20 Hertz and 0.70 kilowatts for 35 seconds and an organo silane-based abrasion-resistant coating was applied to the corona discharge treated surface of the AB film coated lenses by spin coating. The lenses were then heated for 3 hours in a convection oven at 212° F. (100° C.). The thickness of the abrasion-resistant coatings were approximately 2 microns.

Test lenses coated with the abrasion-resistant coating were tested for adhesion of the hard coat using the primary and secondary crosshatch tape peel adhesion test. The tested lenses were found to have 100% adhesion in both the primary (dry) and secondary (wet) crosshatch tape peel adhesion tests.

Test lenses without the abrasion resistant coating were tested for caustic resistance by soaking them for 30 minutes in a deionized water solution of 10% sodium hydroxide and 5% 1-methoxy-2-propanol maintained at 60° C. in a Cole-Parmer ultrasonic tank (model number 8894). Inspection of the lenses after exposure to the sodium hydroxide solution showed no hazing of the AB film surface.

EXAMPLE 2

In the following example, six 70 mm plano PDQ hard-coated polycarbonate lenses obtained from Gentex Optics were used. The test lenses were washed with soapy water, rinsed with clear water and then sprayed with isopropyl alcohol and dried. Test lenses were plasma treated for one minute using a Plasmatech machine at a power setting of 100 Watts, while introducing oxygen at a rate of 100 ml/min into the vacuum chamber of the Plasmatech machine. A photochromic polyurethane coating (of the type described in U.S. Pat. No. 6,187,444 B1) was applied to the plasma treated lenses and thermally cured for 75 minutes at 140° C. in a convection oven. The photochromic polyurethane coating was approximately 20 microns thick. The photochromic coating was plasma treated for one minute using the Plasmatech machine at the same conditions described above. The test lenses were then washed with soapy water and dried.

An acrylate-based masterbatch formulation was prepared from the components reported in Table 2. The components for the masterbatch were combined and stirred for 2 hours using a magnet stir bar and stirring apparatus. Six coating formulations were prepared by mixing 0.83 grams of an adhesion promoter chosen from those listed in Table 3 with 9.17 grams of the masterbatch formulation for 2 hours on a magnetic stir plate with a magnetic stir bar, and each prepared coating formulation applied to the surface of a separate test lens by spin coating. The coatings were cured in a nitrogen atmosphere with UV light from a D bulb. The resulting AB film coatings were approximately 10 microns thick.

TABLE 2

Masterbatch Formulation

| Component/ | Amount (grams) |
|---|---|
| SR-206 (i) | 38.28 |
| BPA-DOH-DMA (j) | 60.86 |
| HEMA (k) | 20.70 |
| Desmodur PL-340 (f) | 35.80 |
| Ethanol | 8.30 |
| Aromatic 100 (m) | 18.14 |
| RK-5345 (n) | 0.86 |
| TPO (o) | 0.28 |
| IRGACURE 819 (p) | 0.18 |

(i) Ethylene Glycol Dimethacrylate (Sartomer)
(j) Bisphenol A Glycerolate (1 glycerol/1 phenol) dimethacrylate (Aldrich)
(k) Hydroxyethyl methacrylate (Aldrich)
(m) Mixture of high temperature boiling solvents (Texaco)
(n) Surface active agent (60% solids in xylene) (Dupont)
(o) Diphenyl (2,4,6-trimethylbenzoyl)phsophine oxide (Aldrich) photoinitiator
(p) Bis(2,4,6-trimethylbenzoyl)-phenylphosphine oxide (Ciba-Geigy) photoinitiator

TABLE 3

Adhesion Promoter Material*

A-1120 [N-(beta aminoethyl)-γ-aminopropyl trimethoxysilane]
A-1637 [N-ethylamino isobutyl trimethoxysilane]
Y-9669 [N-phenyl-γ-aminopropyl trimethoxysilane]
A-Link 15 [N-ethylamino isobutyl trimethoxysilane]
A-174 [3-(trimethoxysilyl) propylmethacrylate]
A-1524 [gamma ureido propyl trimethoxysilane]

*Obtained from GE Silicon OSI Specialities

The AB film coated test lenses were plasma treated for one minute using the Plasmatech machine at a power setting of 100 Watts, while introducing oxygen at a rate of 100 ml/min into the vacuum chamber of the Plasmatech machine, and a siloxane-based hard coat (HiGard® 1035 siloxane hard coat available from PPG Industries, Inc.) was applied to the surface of each of the lenses by spin coating. Afterwards, the lenses were heated at 120° C. for 3 hours in a convection oven. The siloxane-based hard coat had a thickness of approximately 5 microns.

AB film coated test lenses were exposed to UV light and observed to reversibly change color. The hard coated lenses were tested for adhesion of the hard coat using the crosshatch peel test. Each lens was found to have 100% adhesion (0% coating loss) in both the primary (dry) and secondary (wet) crosshatch tape peel adhesion tests.

Although the present invention has been described with reference to specific details of certain embodiments thereof, it is not intended that such details should be regarded as limitations upon the scope of the invention except insofar as they are included in the accompanying claims.

What is claimed is:
1. A photochromic article comprising:
(a) an organic polymeric substrate chosen from thermoset substrates prepared from polymerizable compositions comprising allyl diglycol carbonate monomer(s), substrates prepared from thermoplastic polycarbonates, substrates prepared from polyurea urethanes and substrates prepared from compositions comprising the reaction product of polyfunctional isocyanate(s) and/or isothiocyanates with polythiols or polyepisulfide monomer(s), said substrate having a refractive index of from 1.48 to 1.74,

(b) a photochromic organic polymeric coating appended to at least one surface of said polymeric substrate, said polymeric coating comprising a photochromic amount of at least one organic photochromic material selected from spirooxazines, benzopyrans, naphthopyrans, fulgides, metal dithizonates, diarylethenes and mixtures of such photochromic materials, said photochromic polymeric coating having a thickness of from 5 to 200 microns, and (c) a radiation-cured, acrylate-based film coherently appended to said photochromic polymeric coating, said acrylate-based film having a thickness of from 2 to 20 microns, wherein said acrylate-based film further comprises an adhesion enhancing amount of an organic adhesion promoter chosen from aminoorganosilanes, silane coupling agents, organic titanate coupling agents, organic zirconate coupling agents, and mixtures of said adhesion promoters; wherein the radiation-cured, acrylate-based film of (c) is harder than the photochromic organic polymeric coating of (b); and wherein the radiation-cured, acrylate-based film of (c) is resistant to removal by aqueous inorganic caustic.

2. The photochromic article of claim 1 wherein the photochromic coating is chosen from photochromic polyurethane-based coatings, photochromic polyurea urethane based coatings, photochromic poly(meth)acrylic-based coatings, photochromic aminoplast resin-based coatings and photochromic epoxy resin-based coatings, and said photochromic coating has a thickness of from 10 to 50 microns.

3. The photochromic article of claim 1 wherein the adhesion promoter comprises an aminoorgano silane represented by the general formula:

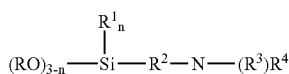

wherein n is an integer of from 0 to 2; each R is independently $C_1$-$C_4$ alkyl, $C_1$-$C_3$ alkoxy $C_1$-$C_3$ alkyl, or $C_6$-$C_8$ aryl; $R^1$ is hydrogen, $C_1$-$C_3$ alkyl, or $C_6$-$C_8$ aryl; $R^2$ is a divalent $C_2$-$C_{10}$ alkylene, $C_2$-$C_5$ alkenylene or phenylene; each $R^3$ and $R^4$ is independently hydrogen, $C_1$-$C_3$ alkyl, $C_2$-$C_3$ hydroxyalkyl, $C_2$-$C_3$ aminoalkyl, $C_5$-$C_6$ cycloalkyl, $C_6$-$C_8$ aryl, or (meth)acrylyloxy $C_1$-$C_4$ alkyl (the alkyl group being optionally substituted with a hydroxy group); or $R^3$ and $R^4$ combine to form a cycloalkyl group of from 5 to 6 carbon atoms, or a $C_4$-$C_7$ heterocyclic group wherein the hetero atom(s) are oxygen and/or nitrogen, or a group represented by the general formula:

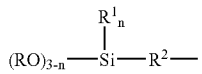

wherein R, $R^1$, $R^2$ and n are as defined above, or hydrolysates of such aminoorganosilanes.

4. The photochromic article of claim 3 wherein the adhesion promoter is present in amounts of from 0.5 to 8 weight percent, based on the total weight of the curable acrylate-based film appended to the photochromic coating.

5. The photochromic article of claim 3 wherein the polymeric substrate is a substrate comprising a thermoplastic polycarbonate.

6. The photochromic article of claim 5, wherein the photochromic article is an ophthalmic article.

7. The photochromic article of claim 6 wherein the ophthalmic article is a lens.

8. The photochromic article of claim 1 wherein the adhesion promoter comprises a silane coupling agent represented by the general formula:

$(R^5)_a(R^6)_b Si [(OR)_3]_c$ wherein each $R^5$ is an organofunctional group independently chosen from epoxy, glycidoxy, amino, vinyl, styryl, (meth)acryloxy, mercapto, ureido, haloalkyl, or a hydrocarbon radical having not more than 10 carbon atoms substituted with said organofunctional group; each $R^6$ is a hydrocarbon radical of not more than 10 carbon atoms that is independently chosen from $C_1$-$C_{10}$ alkyl, or phenyl; each R is independently $C_1$-$C_4$ alkyl, $C_1$-$C_3$ alkoxy $C_1$-$C_{33}$ alkyl, $C_6$-$C_8$ aryl, or acetoxy; a is the integer 1 or 2, b is the integer 0, 1 or 2, and c is the integer 1, 2, or 3, provided that the sum of a+b+c equals 4.

9. The photochromic article of claim 8 wherein the adhesion promoter is present in amounts of from 0.5 to 8 weight percent, based on the total weight of the curable acrylate-based film appended to the photochromic coating.

10. The photochromic article of claim 8 wherein the polymeric substrate is a substrate comprising a thermoplastic polycarbonate.

11. The photochromic article of claim 10, wherein the photochromic article is an ophthalmic article.

12. The photochromic article of claim 11 wherein the ophthalmic article is a lens.

13. The photochromic article of claim 1 further comprising an abrasion-resistant coating affixed to the surface of the acrylate-based film, wherein the abrasion-resistant coating is harder than the acrylate-based film.

14. The photochromic article of claim 13 wherein the abrasion-resistant coating is an organo silane-based coating.

15. The photochromic article of claim 14 further comprising an antireflective coating affixed to the surface of the abrasion-resistant film.

16. The photochromic article of claim 1 wherein the radiation-cured, acrylate-based film is derived from 25 to 35 weight percent diacrylate materials, based on the total quantity of polymerizable monomeric materials used to prepare the radiation-cured, acrylate-based film.

* * * * *